US008765862B2

(12) United States Patent
Matsumura et al.

(10) Patent No.: US 8,765,862 B2
(45) Date of Patent: Jul. 1, 2014

(54) METAL NANOPARTICLE COMPOSITE AND PRODUCTION METHOD THEREOF

(75) Inventors: Yasufumi Matsumura, Chiba (JP); Ryuzo Shinta, Chiba (JP); Yasushi Enomoto, Chiba (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 69 days.

(21) Appl. No.: 13/581,800

(22) PCT Filed: Feb. 8, 2011

(86) PCT No.: PCT/JP2011/052607
§ 371 (c)(1),
(2), (4) Date: Aug. 30, 2012

(87) PCT Pub. No.: WO2011/108342
PCT Pub. Date: Sep. 9, 2011

(65) Prior Publication Data
US 2012/0329935 A1 Dec. 27, 2012

(30) Foreign Application Priority Data

Mar. 1, 2010 (JP) ................................. 2010-044108
Mar. 31, 2010 (JP) ................................. 2010-083118

(51) Int. Cl.
| C08J 7/00 | (2006.01) |
| C08J 7/12 | (2006.01) |
| C08J 7/14 | (2006.01) |
| C08K 3/08 | (2006.01) |
| C08L 79/08 | (2006.01) |

(52) U.S. Cl.
CPC ..... *C08J 7/00* (2013.01); *C08J 7/08* (2013.01); *C08J 7/14* (2013.01); *C08K 3/08* (2013.01); C08L 79/08 (2013.01); Y10S 977/90 (2013.01); Y10S 977/778 (2013.01)
USPC ........... 524/440; 427/380; 977/900; 977/778

(58) Field of Classification Search
CPC ................. C08J 7/00; C08J 7/08; C08J 7/12; C08J 7/14; C08K 3/08; C08L 79/08
See application file for complete search history.

(56) References Cited

U.S. PATENT DOCUMENTS

| 5,575,955 | A  | * | 11/1996 | Caplan et al. | .................. | 252/514 |
| 2007/0212496 | A1 | * | 9/2007 | Tomita et al. | ................. | 427/483 |
| 2009/0087582 | A1 | * | 4/2009 | Watanabe et al. | ............. | 427/558 |
| 2010/0267885 | A1 | * | 10/2010 | Harimoto | ...................... | 524/500 |

FOREIGN PATENT DOCUMENTS

| JP | 07-082410 | 3/1995 |
| JP | 2919612 | 7/1999 |
| JP | H11-302375 | 11/1999 |
| JP | 2000-290642 | 10/2000 |
| JP | 2002-179931 | 6/2002 |
| JP | 2002-363319 | 12/2002 |
| JP | 2005-169775 | 6/2005 |
| JP | 3846331 | 11/2006 |
| JP | 2009-521598 | 6/2009 |
| JP | 4280221 | 6/2009 |

OTHER PUBLICATIONS

"Office Action of China Counterpart Application", issued on Aug. 5, 2013, with English translation thereof, p. 1-p. 16.
Zhang et al., "Fabrication of Polyimide/ Silver Composite Films and Study on the Relationship Between Morphology and Properties of the Films", Acta Materiae Compositae Sinica, Aug. 2005, p. 30-p. 34, vol. 22, No. 4.
"International Preliminary Report on Patentability (Form PCT/IPEA/409)", published on Jul. 3, 2012, with English translation thereof, pp. 1-10.

* cited by examiner

*Primary Examiner* — Brieann R Fink
(74) *Attorney, Agent, or Firm* — Jianq Chyun IP Office

(57) ABSTRACT

A metal nanoparticle composite is provided, in which a matrix resin layer and metal nanoparticles are immobilized on the matrix resin layer. The metal nanoparticle composite has the following characteristics: a) the metal nanoparticles are obtained by heat-reducing metal ions or metal salts contained in the matrix resin layer or a precursor resin layer thereof; b) the metal nanoparticles exist within a region from the surface of the matrix resin layer to a depth of at least 50 nm; c) particle diameters of the metal nanoparticles are in the range of 1 nm to 100 nm with the mean particle diameter of greater than and equal to 3 nm; and d) a spacing between adjacent metal nanoparticles is greater than and equal to the particle diameter of a larger one of the adjacent metal nanoparticles.

16 Claims, 2 Drawing Sheets

METAL NANOPARTICLE COMPOSITE AND PRODUCTION METHOD THEREOF

CROSS-REFERENCE TO RELATED APPLICATION

This application is a 371 of international application of PCT application Ser. No. PCT/JP2011/052607, filed on Feb. 8, 2011, which claims the priority benefit of Japan application no. 2010-044108, filed on Mar. 1, 2010, and Japan application no. 2010-083118, filed on Mar. 31, 2010. The entirety of each of the above-mentioned patent applications is hereby incorporated by reference herein and made a part of this specification.

BACKGROUND OF THE INVENTION

1. Field of the Invention

The present invention relates to a metal nanoparticle composite applicable to various devices that use Local Surface Plasmon Resonance (LSPR) and a production method of the metal nanoparticle composite.

2. Description of Related Art

LSRP is a resonance phenomenon due to an interaction between electrons in metal nanoparticles or metal microstructures having a size of several nanometers to 100 nm and light of a specific wavelength. Since a long time ago, LSPR has been used in stained glass which exhibits bright colors by mixing metal nanoparticles in a glass. In recent years, in the industry, researches have been conducted on developing high-power light-emitting lasers, which utilize enhanced light intensity and on applications such as biosensors, which utilize the resonance state change property when molecule bonding occurs.

In order to apply such LSPR of metal nanoparticles to sensors, metal nanoparticles should be immobilized in a matrix such as a synthetic resin. However, if the metal nanoparticles are on a nanometer scale, the aggregation and dispersion characteristics change, for example, the stable dispersion due to an electrostatic repulsion effect becomes difficult, and aggregation is likely to occur. Therefore, for plasmon devices that use LSPR, it is essential to homogenously disperse the metal nanoparticles in the matrix.

For example, the following Patent Documents 1 to 6 propose technologies of metal nanoparticle composites for immobilizing metal nanoparticles in matrixes, such as resin. In Patent Document 1, with a high-elastic modulus polymer composite material due to a small particle size, a good dispersion characteristic of particles and good adherence of particles to the matrix, a polymer-metal cluster composite with improved elastic modulus formed by filling metal particles in a thermoplastic or thermosetting polymer matrix is disclosed, where particle diameters of the metal particles are 10 angstroms to 20 angstroms, and the metal particles are uniformly dispersed with a volume fraction of 0.005% to 0.01%. However, in the polymer-metal cluster composite in Patent Document 1, metal nanoparticles are dispersed to improve the elastic modulus, and as a result, the particle diameters are too small to be applied in generating plasmon resonance.

Patent Document 2 has disclosed a production method of a metal nanoparticle dispersion for forming a novel conductive coating that can substitute the electroless plating method or applied to a granular magnetic film by reducing nanoparticle dispersion in a gaseous phase after a resin substrate containing an ion exchange site contacts with a solution containing metal ions. In this method, during the hydrogen reduction, metal ions are dispersed in the resin while reacting; therefore, no metal nanoparticle is present in a region from the surface of the resin substrate to a depth of tens of nanometers (which is 80 nm in the example of Patent Document 2). Although this feature provides an advantage that no protection film is needed when the magnetic film is formed by using magnetic nanoparticles because the metal nanoparticles are embedded in the depth of the matrix, the feature sometimes becomes a disadvantage when being implemented. In addition, as disclosed in Patent Document 2, through the heat-reduction in a hydrogen atmosphere, the metal nanoparticles precipitated through reduction become a catalyst for promoting thermal decomposition of the resin matrix caused by hydrogen, and sometimes contraction of the resin matrix occurs. In addition, control of the particle spacing between adjacent metal nanoparticles in the resin matrix is not taken into consideration.

Patent Document 3 has disclosed the following method: contacting a polyimide resin film with a liquid containing metal ions to dope metal ions in the resin film, where the polyimide resin film has been processed by an alkaline aqueous solution to introduce a carboxyl group into the polyimide resin film; after that, at a temperature higher than the reduction temperature of the metal ions, performing a first heat treatment in a reducing gas, so as to form a layer which is a polyimide resin dispersed with metal nanoparticles; and further performing a second heat treatment at a temperature different from that of the first heat treatment. Patent document 3 has documented that the volume fill ratio of the metal nanoparticles in the composite film may be controlled by adjusting the thickness of the metal nanoparticle dispersion layer through the second heat treatment. Patent Document 3 has documented the following situation: through the heat treatment in the reducing gas, metal ions that are bonded or adsorbed in a region from a surface of the polyimide resin film to a depth of several micrometers are dispersed in the resin film while participating in the reduction reaction. Therefore, the metal nanoparticles are uniformly dispersed in the resin matrix within a region from the surface of the resin film to a depth from tens of nanometers to several micrometers, and no metal nanoparticle is present near the surface. Like the feature in Patent Document 2, this feature also becomes a disadvantage sometimes when being implemented. In addition, similar to the technology in Patent Document 2, the technology in Patent Document 3 does not provide the consideration of controlling of the particle spacing between adjacent metal nanoparticles in the resin matrix.

Patent Document 4 and Patent Document 5 have disclosed a heat sensitive color-developing element using a solid matrix, wherein micro metal nanoparticles that irreversibly grow by means of temperature change are dispersed in the solid matrix through plasmon resonance. The technology of Patent Documents 4 and 5 is under the premise that the micro metal nanoparticles are aggregated by means of temperature change, and the particle diameter is increased to generate plasmon attraction; metal nanoparticles are dispersed into the matrix, while controlling over the spacing between adjacent nanoparticles is not taken into consideration.

Patent Document 6 has disclosed a method for photo-reducing a metal precursor through exposure to ultraviolet rays after the metal precursor is dispersed into a matrix of polymer substance at a molecular level during a process of dispersing metal particles into the polymer matrix, so as to solve problems such as intermiscibility with the polymer matrix, interface defects and cohesion among particles. However, in the method of Patent Document 6, the metal nanoparticles are precipitated through reduction by using ultraviolet rays, so due to the influence of an ultraviolet radiation surface, a gradient concerning precipitation density of the metal nanoparticles is generated from a surface portion to a deep portion of the matrix. That is, from the surface portion to the deep portion of the matrix, the particle diameters and the fill ratio of the metal nanoparticles tend to decline consecutively. In addition, although the particle diameters of the metal nanoparticles obtained through photo-reduction are the greatest at the ultraviolet radiation surface, namely, the surface portion of the matrix, the particle diameters are about 10 nm at most. In addition, it is difficult to disperse metal nanoparticles having the same particle diameters or larger particle diameters into the deep portion.

TECHNICAL DOCUMENTS OF THE PRIOR ART

Patent Documents

Patent Document 1: Japanese Examined Patent Publication No. Hei 08-16177
Patent Document 2: Japanese Patent No. 3846331
Patent Document 3: Japanese Patent No. 4280221
Patent Document 4: Japanese Unexamined Patent Publication No. 2000-290642
Patent Document 5: Japanese Patent No. 2919612
Patent Document 6: Japanese Unexamined Patent Publication No. 2002-179931

SUMMARY OF THE INVENTION

Problem to be Solved

When the metal nanoparticle composite with metal nanoparticles dispersed in the matrix is used in an LSPR sensor or for other purposes, it is essential that the absorption spectrum is intense. In addition, generally when the absorption spectrum is sharper, the detection is more sensitive. In order to obtain an intense and sharp absorption spectrum, the metal nanoparticle composite should have the following structural features:
1) The size of the metal nanoparticles is controlled in a specified range.
2) The shape of the metal nanoparticles is uniform.
3) Adjacent metal nanoparticles are separated from each other with a particle spacing therebetween greater than and equal to a certain value.
4) The volume fill ratio of the metal nanoparticles relative to the metal nanoparticle composite is controlled within a certain range.
5) The metal nanoparticles are uniformly dispersed within a region from the surface portion of the matrix with a specified interparticle distance maintained in the thickness direction.

The present invention is provided to solve the issues unsolved in the prior art, and is directed to a metal nanoparticle composite that can obtain an intense and sharp absorption spectrum through LSPR.

Technical Means to Solve the Problem

The inventors conducted researches on the foregoing actual situation and discovered that: the present invention is achieved by having a metal nanoparticle composite produced by heat-reducing metal ions contained in a resin to precipitate metal nanoparticles to meet the foregoing requirement.

A metal nanoparticle composite according to a first aspect of the present invention includes a matrix resin layer and metal nanoparticles immobilized on the matrix resin layer, and has the following structures a to d:

a) the metal nanoparticles are obtained through heat-reducing metal ions or metal salts contained in the matrix resin layer or a precursor resin layer thereof;
b) the metal nanoparticles are present within a region from a surface of the matrix resin layer to a depth of at least 50 nm;
c) particle diameters (D) of the metal nanoparticles are in the range of 1 nm to 100 nm with the mean particle diameter of greater than and equal to 3 nm; and
d) the spacing between adjacent metal nanoparticles is greater than and equal to the particle diameter of a larger one of the adjacent metal nanoparticles.

In the metal nanoparticle composite according to the first aspect of the present invention, a volume fraction of the metal nanoparticles relative to the metal nanoparticle composite may be in the range of 0.05% to 23%.

In addition, the metal nanoparticle composite according to the first aspect of the present invention may further include the following structure e:
e) the metal nanoparticles interact with light having a wavelength greater than and equal to 380 nm, thereby generating LSPR.

In addition, in the metal nanoparticle composite according to the first aspect of the present invention, the matrix resin layer may include polyimide resin. In this case, the polyimide resin may be transparent or colorless.

In addition, in the metal nanoparticle composite according to the first aspect of the present invention, the matrix resin layer may be obtained by coating a polyamic acid resin solution on a substrate and drying to form a polyamic acid resin film, and then imidizing the polyamic acid resin film. In this case, the polyamic acid resin solution may contain a metal compound to be used as a raw material of the metal nanoparticles, and the particle diameters of the metal nanoparticles may be in the range of 30 nm to 100 nm. Alternatively, the polyamic acid resin film may be impregnated with a solution containing metal ions or a metal compound to be used as a raw material of the metal nanoparticles, and is imidized to obtain the metal nanoparticle composite.

In addition, in the metal nanoparticle composite according to the first aspect of the present invention, the matrix resin layer may be obtained by performing alkali modification on a surface of a polyimide film to obtain a polyamic acid resin layer, and then imidizing the polyamic acid resin layer. In this case, the polyamic acid resin layer is impregnated with a solution containing metal ions or a metal compound to be used as a raw material of the metal nanoparticles, and then is imidized to obtain the metal nanoparticle composite.

In addition, the metal nanoparticle composite according to the first aspect of the present invention may be formed by forming a specified pattern on the substrate.

In addition, in a production method of a metal nanoparticle composite according to a second aspect of the present invention, metal nanoparticles with a mean particle diameter in the range of 20 to 30 nm in a polyimide resin do not contact each other, and are dispersed independently, and the method includes the following Steps A and B:

A) a step of coating a coating liquid containing polyamic acid resin and a metal compound on a substrate, in which the content of a metal component is in the range of 1 μg/cm$^2$ to 30 μg/cm$^2$, and drying to form a coating film with a thickness in the range of 30 nm to 1.7 μm; and
B) a step of performing heat treatment on the coating film at a temperature in the range of 200° C. to 450° C., precipitating metal nanoparticles by reducing metal ions (or metal salts) in the coating film to disperse the metal nanoparticles in the coating film, and imidizing the polyamic acid resin in the coating film to form a polyimide resin layer with a thickness in the range of 25 nm to 1 μm. In this case, the spacing between two adjacent nanoparticles is preferably greater than and equal to the particle diameter of a larger one of the adjacent metal nanoparticles.

In addition, in the production method of a metal nanoparticle composite according to the second aspect of the present invention, the volume fraction of the metal nanoparticles relative to the metal nanoparticle composite is preferably in the range of 1% to 10%.

In addition, in the production method of a metal nanoparticle composite according to the second aspect of the present invention, Step B) is preferably performed in an inert gas atmosphere.

In addition, in the production method of a metal nanoparticle composite according to the second aspect of the present invention, the metal compound is preferably a precursor of Au.

Effect of the Invention

In the metal nanoparticle composite according to the first aspect of the present invention, metal nanoparticles are reduced and precipitated from a state of metal ions (or metal salts) in the matrix resin layer (or the precursor resin layer thereof). Therefore, a composite containing metal nanoparticles of a nanometer scale can be easily produced. Moreover, this reducing treatment is a heat-reducing treatment, and therefore, through thermal diffusion, the precipitated metal nanoparticles may be dispersed in the matrix resin with an interparticle distance greater than and equal to a certain value. In addition, the metal nanoparticles dispersed with the interparticle distance of greater than and equal to a certain value exist within a region from a surface portion of the matrix resin, and the metal nanoparticles are also uniformly dispersed in the thickness direction with a specified interparticle distance. Therefore, the LSPR absorption spectrum is sharp. Further, since the metal nanoparticles is present within a region from the surface portion of the matrix resin, regardless of the transmittance of the matrix resin, the LSPR near the surface portion of the matrix resin can be used. The metal nanoparticle composite of the present invention having such structural features is not only applicable to the field of applying the local surface plasmon effect, but also applicable to various industrial fields such as electromagnetic shielding materials, magnetic noise-absorbing materials and high-thermal conductivity resin materials.

In the production method of a metal nanoparticle composite according to the second aspect of the present invention, the content of the metal compound in the polyamic acid resin can be easily adjusted. Therefore, the content of the metal nanoparticles dispersed in the polyimide resin can be easily adjusted, and it is easy to produce the metal nanoparticle composite containing larger metal nanoparticles with particle diameters greater than and equal to 20 nm. As the particle diameters of the metal nanoparticles increase, a change of the plasmon resonance wavelength relative to a change of dielectric constant at the periphery of the metal nanoparticles becomes significant. Therefore, when the metal nanoparticle composite is applied to sensors, the particle diameters are preferably greater than and equal to 20 nm. Moreover, in the production method of a metal nanoparticle composite according to the present invention, the polyamic acid resin can be imidized by using the heat in the reducing treatment, thereby simplifying the production steps.

The metal nanoparticle composite obtained by the production method according to the present invention are obtained by reducing and precipitating metal nanoparticles from a state of metal ions (or metal salts) in the polyamic acid resin. Therefore, a composite containing metal nanoparticles of a nanometer scale can be easily produced. Moreover, this reducing treatment is heat treatment, and therefore, through thermal diffusion, the precipitated metal nanoparticles may be dispersed in the matrix resin with an interparticle distance greater than and equal to a certain value. In addition, the metal nanoparticles exist within a region from the surface portion of the matrix resin, and are dispersed with the interparticle distance of greater than and equal to a certain value. The metal nanoparticle composite of the present invention having such structural features is not only applicable to the field of use of the local surface plasmon effect, but also applicable to various industrial fields such as electromagnetic shielding materials, magnetic noise-absorbing materials and high-thermal conductivity resin material.

DESCRIPTION OF THE EMBODIMENTS

Aspects of embodiments of the present invention are described in detail with reference to the accompanying drawings.

[First Embodiment]

First, a metal nanoparticle composite and a production method thereof according to the first embodiment of the present invention are described.

<Metal Nanoparticle Composite>

Figure 1:
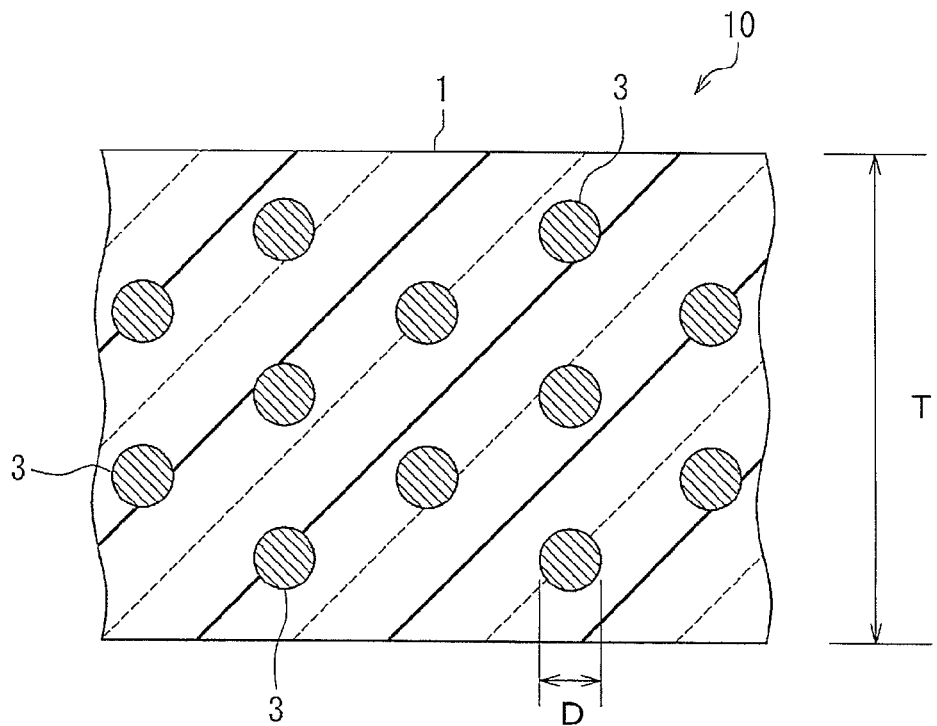
FIG. 1 is a schematic cross-sectional structural view of a nanocomposite material dispersed with metal nanoparticles according to a first embodiment of the present invention in a thickness direction.
Figure 2:
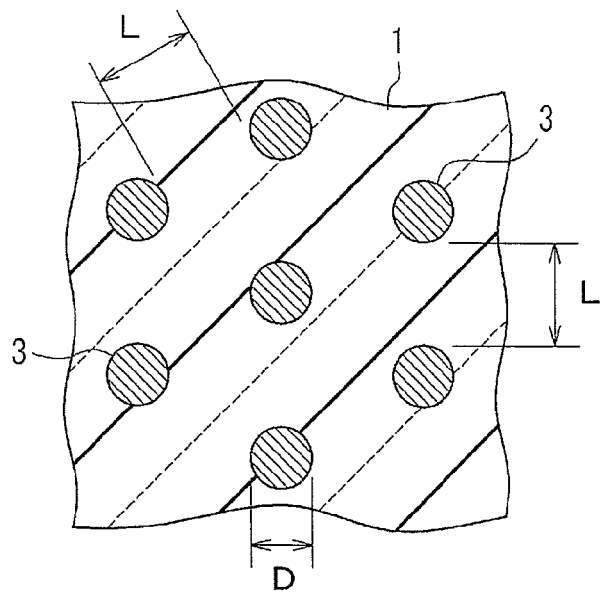
FIG. 2 is a schematic cross-sectional structural view of the nanocomposite material in FIG. 1 along a plane parallel to a surface of the nanocomposite material.
Figure 3:
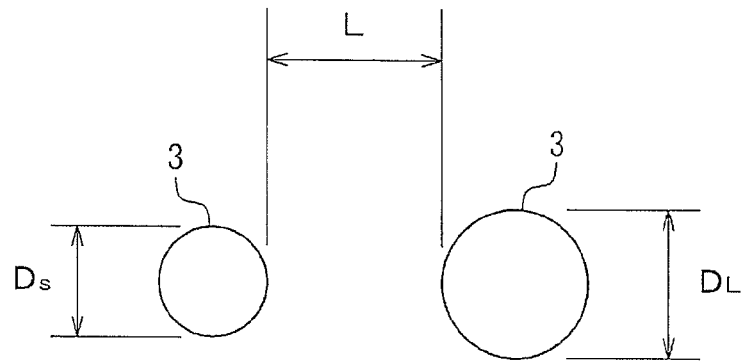
FIG. 3 is a view illustrating the structure of metal nanoparticles.

FIG. 1 shows a schematic cross-sectional structural view of a nanocomposite material dispersed with metal nanoparticles (abbreviated as nanocomposite material hereinafter) 10 of a metal nanoparticle composite of this embodiment in the thickness direction. The nanocomposite material 10 includes a matrix resin layer 1 and metal nanoparticles 3 immobilized in the matrix resin layer 1. FIG. 2 shows a schematic cross-sectional structure of the nanocomposite material 10 in the plane direction; FIG. 3 is an amplified view of metal nanoparticles 3. Besides, in FIG. 3, $D_L$ denotes the particle diameter of the larger metal nanoparticle 3 of two adjacent metal nanoparticles 3, and $D_S$ denotes the particle diameter of the smaller metal nanoparticle 3. However, when the diameter particles are not distinguished from each other, the particle diameters are merely represented as D.

Besides, the nanocomposite material 10 may also have a substrate which is not shown in the figures. The substrate may be made of glass, ceramic, silicon wafer, semiconductor, paper, metal, metal alloy, metal oxide, synthetic resin, organic/inorganic composite materials, and so on, and may be in a shape of plate, sheet, thin film, nest, geometric pattern, convex and concave, fiber, snake belly, multilayer, ball, and so on. In addition, the surface of the substrate may undergo silicone coupling agent treatment, chemical etching treatment, plasma treatment, alkali treatment, acid treatment, ozone treatment, ultraviolet treatment, electric grinding treatment, grinding treatment by using an abrasive, and so on.

<Matrix Resin Layer>

The matrix resin layer 1 may be formed to be a film shape as a whole, and may also be formed as a part of the resin film. Although the thickness T of the matrix resin layer 1 varies with the particle diameters D of the metal nanoparticles 3, in applications of LSPR, the thickness T is preferably in the range of 20 nm to 25 μm, and more preferably in the range of 30 nm to 1 μm.

In order to produce surface plasmon resonance of the metal nanoparticles 3, the resin for forming the matrix resin layer 1 is preferably light-transmissive, and is more preferably a material that light with a wavelength greater than and equal to 380 nm can penetrate. In such matrix resin layer 1, light-transmitting LSPR can be used. In another aspect, the resin that is almost non-light-transmissive can also be used as the matrix resin layer 1, in which light-reflecting LSPR can be used. In addition, a step of exposing a part of the metal nanoparticles 3 from the surface of the matrix resin layer 1 can be easily performed. This embodiment is not limited to the light-transmitting and light-reflecting LSPR, for example, the embodiment can be applied to a sensitivity sensor for sensing changes outside the matrix resin layer 1.

A resin material useful in the matrix resin layer 1 is not particularly limited, and may be, for example, a polyimide resin, a polyamic acid resin, Cardo resin (fluorene resin), a polysiloxane resin such as polydimethylsiloxane (PDMS), polyethylene terephthalate (PET) resin, a polyphenylene ether resin, an epoxy resin, a fluorine-containing resin, a vinyl resin, a phenolic resin, or an ion exchange resin, and among them, the resins having a functional group capable of forming complexes with metal ions or adsorbing metal ions in a uniform dispersion state through interaction with the metal ions are preferred. The functional group may be, for example, carboxyl group, sulfonic acid group, quaternary ammonium group, primary amino group and secondary amino group, and phenolic hydroxyl. From this point of view, the polyamic acid resin and ion exchange resin are preferred. In addition, the metal nanoparticles undergo heat treatment during precipitation, and therefore, a heat-resistant material that can withstand a temperature of 140° C. or higher is preferred. From this point of view, the polyamic acid resin, as a polyimide resin precursor, has a carboxyl group that can form a complex with metal ions, and can adsorb metal ions at a precursor stage; and furthermore, the polyamic acid resin has heat resistance against heat treatment, and is preferably used as the material of the matrix resin layer 1. Details of the polyimide resin and polyamic acid resin will be described below. In addition, the resin material may be a resin material containing a single type of resin, or a resin material containing a plurality of types of resins that are mixed.

<Metal Nanoparticles>

In the nanocomposite material 10 of this embodiment, the metal nanoparticles 3 meet the following requirements a) to d).

a) The metal nanoparticles 3 are obtained by heat-reducing metal ions or metal salts contained in the matrix resin layer 1 or a precursor resin layer thereof. The material of the metal nanoparticles 3 is not particularly limited, provided that the metal nanoparticles can be obtained in the foregoing manner, and the material may be, for example, metals such as gold (Au), silver (Ag), copper (Cu), cobalt (Co), nickel (Ni), palladium (Pd), platinum (Pt), tin (Sn), rhodium (Rh), and iridium (Ir). In addition, an alloy of these metals (such as platinum-cobalt alloy) may also be used. Among these metals, metals that can produce LSPR, for example, gold (Au), silver (Ag), copper (Cu), palladium (Pd), platinum (Pt), tin (Sn), rhodium (Rh), and iridium (Ir), are preferred.

The metal nanoparticles 3 may be in various shapes such as a ball, an ellipsoid, a cube, a truncated tetrahedron, a bipyramid, an octahedron, a decanedron and an icosahedron, with a ball shape that can make the absorption spectrum of the LSPR sharp being preferred. Herein, the shape of the metal nanoparticles 3 may be confirmed through observation by using a Transmission Electron Microscope (TEM). Moreover, the mean particle diameter of the metal nanoparticles 3 is set to a measured area mean diameter of any 100 metal nanoparticles 3. In addition, the spherical metal nanoparticles 3 are metal nanoparticles in shapes of balls or close to balls, and refer to metal nanoparticles with a ratio of a mean long diameter to a mean short diameter being 1 or close to 1(greater than and equal to 0.8 is preferred). Besides, the relationship between the long diameters and short diameters of metal nanoparticles 3 is preferably in the range of the following formula: the long diameter<the short diameter×1.35, and is more preferably in the range of the following formula: the long diameter≤the short diameter×1.25. In addition, when the metal nanoparticles 3 are not spherical (for example, the metal nanoparticles 3 are in the shape of a octahedron), the length of a longest edge of the metal nanoparticle 3 is set to be the long diameter of the metal nanoparticle 3, and the length of a shortest edge is set to be a short diameter of the metal nanoparticle 3, where the long diameter is regarded as the particle diameter D of the metal nanoparticle 3.

b) The metal nanoparticles 3 are present within a region from a surface of the matrix resin layer 1 to a depth of at least 50 nm. The metal nanoparticles 3 are present within the region, and therefore, regardless of the transmittance of the matrix resin layer 1, the light-reflecting LSPR can be used.

c) The particle diameters (D) of the metal nanoparticles 3 are in the range of 1 nm to 100 nm with the mean particle diameter of greater than and equal to 3 nm. The mean particle diameter herein refers to a mean value of the diameters (a median diameter) of the metal nanoparticles 3.

For the particle diameters D of the metal nanoparticles 3, the diameters of 90% to 100% of the metal nanoparticles 3 are preferably less than and equal to 100 nm. If the particle diameters D of the metal nanoparticles 3 exceed 100 nm, it is difficult to achieve a sufficient LSPR effect. In addition, even if particle diameter distribution of the maximum particle diameter having a maximum particle diameter of less than and equal to 50 nm to 60 nm in the nanocomposite material 10 is relatively large, since the metal nanoparticles 3 are dispersed with a spacing greater than and equal to the following particle diameter, the nanocomposite material 10 with a sharp LSPR absorption spectrum can be easily obtained. Therefore, in the nanocomposite material 10 containing metal nanoparticles 3 having a maximum particle diameter of less than and equal to 50 nm to 60 nm, the particle diameter distribution of the metal nanoparticles 3 is not limited, and the nanocomposite material 10 becomes an exemplary aspect. In another aspect, for nanocomposite material 10 containing metal nanoparticles 3 having particle diameters of greater than and equal to 60 nm, the smaller the particle diameter distribution of the metal nanoparticles 3 is, the sharper the wave crest of the LSPR absorption spectrum is. Therefore, the particle diameter distribution of the metal nanoparticles 3 is preferably controlled to be small. However, the particle diameter distribution of the metal nanoparticles 3 is not particularly limited. As for the feature that the metal nanoparticles 3 are dispersed with the interparticle distance of greater than and equal to the particle diameters, the metal nanoparticles 3 may be, for example, set to be magnetic metal nanoparticles, which can be used as magnets having excellent properties.

When the metal nanoparticles 3 are not spherical, due to the trend that the greater the apparent diameter is, the wider the LSPR absorption spectrum is, if the metal nanoparticles 3 are not spherical, the particle diameters D are preferably less than and equal to 30 nm, more preferably less than and equal to 20 nm, and further more preferably less than and equal to 10 nm. In addition, when the metal nanoparticles 3 are not spherical, compared with shapes of other metal nanoparticles 3, preferably, the shapes of at least 80%, and more preferably, at least 90% of metal nanoparticles 3 in the matrix resin layer 1 are basically the same; and more preferably, the shapes are basically the same.

The metal nanoparticles 3 with the particle diameters D of less than 1 nm may be present in the nanocomposite material 10, such nanocomposite material 10 is not likely to affect the LSPR, and no specific problem occurs. In addition, based on 100 parts by weight of the metal nanoparticles 3 in the nanocomposite material 10, for example, when the metal nanoparticles 3 are silver nanoparticles, the amount of the metal nanoparticles 3 with the particle diameters D of less than 1 nm is preferably set to be less than and equal to 10 parts by weight, and more preferably less than and equal to 1 part by weight. Herein, the metal nanoparticles 3 with the particle diameter D of less than 1 nm may be detected by using an X-ray Photoelectron Spectroscope (XPS) analyzer or Energy Dispersive X-ray (EDX) analyzer.

In addition, in order to achieve a better LSPR effect, the mean particle diameter of the metal nanoparticles 3 is preferably set to be greater than and equal to 3 nm, and more preferably in the range of 5 nm to 50 nm. When the mean particle diameter of the metal nanoparticles 3 is less than 3 nm, the LSPR absorption spectrum tends to be less intense.

d) A spacing between adjacent metal nanoparticles 3 (an interparticle distance) L is greater than and equal to the particle diameter $D_L$ of a larger one of the adjacent metal nanoparticles 3, that is, $L \geq D_L$. In addition, the relationship of the larger particle diameter $D_L$ and the smaller particle diameter $D_S$ of the adjacent metal nanoparticles 3 satisfy the relationship of $D_L \geq D_S$. The nanocomposite material 10 of this embodiment meets the requirement a), so that the thermal diffusion of precipitated metal nanoparticles 3 is faciliated, and the metal nanoparticles 3 are dispersed in the matrix resin 1 with the interparticle distance L of greater than and equal to the larger particle diameter $D_L$ of the adjacent metal nanoparticles 3. When the interparticle distance L is less than the larger particle diameter $D_L$, particles may interfere with each other when the LSPR is generated, for example, two particles move together like a larger particle and generate LSPR, so that a sharp absorption spectrum cannot be obtained. In another aspect, even if the interparticle distance L is great, no specific problem occurs. However, as for the interparticle distance L in the metal nanoparticles 3 that are in a dispersed state through heat diffusion, since the particle diameters D of the metal nanoparticles 3 are closely associated with the volume fraction of the metal nanoparticles 3, an upper limit of the interparticle distance L may be controlled according to a lower limit of the volume fraction of the metal nanoparticles 3. When the interparticle distance L is great, in other words, when the volume fraction of the metal nanoparticles 3 relative to the nanocomposite material 10 is low, the LSPR absorption spectrum becomes less intense. In this case, by increasing the thickness of the nanocomposite material 10, the intensity of LSPR absorption spectrum is enhanced.

Besides, the metal nanoparticles 3 are dispersed in the matrix resin layer 1 in a three-dimensional manner. That is, if the section in the thickness direction of the film matrix resin layer 1 is observed in the nanocomposite material 10, the state is as shown in FIG. 1: a large quantity of metal nanoparticles 3 are dispersed longitudinally and horizontally with the interparticle distance L of greater than and equal to the particle diameter $D_L$. If a section parallel to the surface of the matrix resin layer 1 is observed in the nanocomposite material 10, the observed state is as shown in FIG. 2: a large quantity of metal nanoparticles 3 are dispersed and distributed in the matrix resin layer 1 with the interparticle distance L of greater than and equal to the particle diameter $D_L$.

Further, at least 90% of the metal nanoparticles 3 are preferably single particles dispersed with the interparticle distance L of greater than and equal to the particle diameter $D_L$. The "single particles" herein refers to the metal nanoparticles 3 in the matrix resin layer 1 being present independently, and not a plurality of particles coagulated together (coagulated particles). That is, the single particles do not include any coagulated particle in which a plurality of metal nanoparticles is coagulated by means of an intermolecular force. In addition, the coagulated particle refers to a particle that is formed by coagulating a plurality of individual metals and can be clearly identified when being observed by using, for example, a TEM. In addition, the chemical structure of the metal nanoparticles 3 in the nanocomposite material 10 can also be illustrated as metal nanoparticles formed by coagulating metal atoms that are generated through heat-reduction. It is generally considered that the metal nanoparticles 3 are formed through metal bonds of metal atoms, so as to be distinguished from the coagulated particles formed by coagulating a plurality of particles, for example when being observed with a TEM, the metal nanoparticles 3 are identified as independent metal nanoparticles 3.

Since at least 90% of the metal nanoparticles are single particles, the LSPR absorption spectrum is sharp and stable, thereby obtaining a high detection precision. In other words, this case refers to that the coagulated particles or the particles dispersed with the interparticle distance L of less than and equal to the particle diameter $D_L$ account for less than and equal to 10%. If such particles exceed 10%, the surface plasmon resonance absorption spectrum becomes wider or unstable; and when being use in, such as sensors, it is difficult to obtain a high detection precision. Besides, if the coagulated particles or the particles dispersed with the interparticle distance L of less than and equal to the particle diameter $D_L$ account for more than 10%, it is extremely difficult to control the particle diameters D.

Moreover, relative to the nanocomposite material 10, the volume fraction of the metal nanoparticles 3 in the matrix resin layer 1 is preferably set to be 0.05% to 23%. The volume fraction herein refers to a ratio of a total volume of the metal nanoparticles 3 to a certain volume of the nanocomposite material 10 in percentage. If the volume fraction of the metal nanoparticles 3 is less than 0.05%, the intensity of LSPR absorption spectrum is very small, and it is difficult to achieve the effect of the present invention even if the thickness of the nanocomposite material 10 is increased. In another aspect, if the volume fraction exceeds 23%, the spacing (interparticle distance L) of the adjacent metal nanoparticles 3 is less than the particle diameter $D_L$ of a larger one of the adjacent metal nanoparticles 3, so it is difficult to obtain a sharp peak of the LSPR absorption spectrum.

In the nanocomposite material 10 of this embodiment, besides the requirements a) to d), the metal nanoparticles 3 preferably meet the requirement e). That is, e) the metal nanoparticles 3 interact with light to generate LSPR. A wavelength range for generating the LSPR varies along with the particle diameters D, particle shapes, the type of the metal, and interparticle distance L of the metal nanoparticles 3, and the reflective index of the matrix resin. Preferably, light with a wavelength above 380 nm is used to induce the LSPR.

<Application Example of the Nanocomposite Material>

Figure 4:
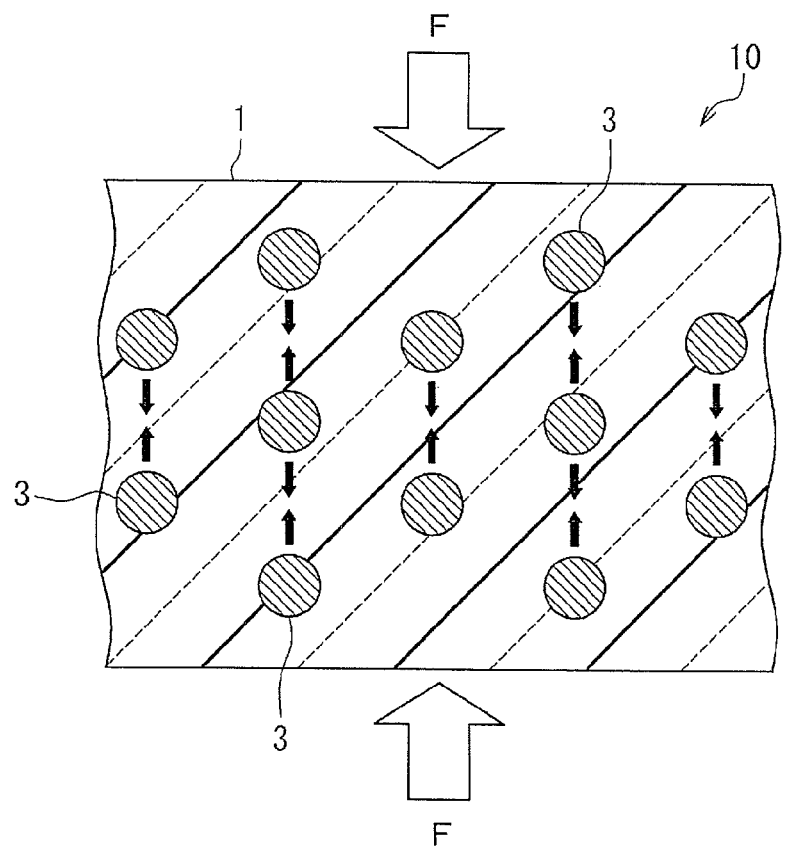
FIG. 4 is a view illustrating a principle of a functional mechanism when a nanocomposite material is applied to a pressure sensor.

FIG. 4 schematically illustrates a measurement principle when the nanocomposite material 10 is applied to a pressure sensor. For example, the matrix resin layer 1 has a certain degree of elasticity. Therefore, if a pressure F is applied to the nanocomposite material 10, the spacing (interparticle distance L) between adjacent metal nanoparticles 3 in the thickness direction of the nanocomposite material 10 decreases. If the interparticle distance L changes, the distribution of the LSPR absorption spectrum during light radiation also changes. If the interparticle distance L of the adjacent metal nanoparticles 3 is decreased to be less than and equal to a certain value, the adjacent metal nanoparticles 3 move as one nanoparticle, and changes in color developing occur. In this way, by measuring the change of the LSPR absorption spectrum, the pressure can be detected with high sensitivity. The pressure sensor using the LSPR does not require any complex mechanism, and identification can be conducted through color developing. Therefore, such pressure sensors can be applied to many fields as a pressure detection technology with a simple structure.

In the nanocomposite material 10 having the structure according to the embodiment, the metal nanoparticles 3 are uniformly dispersed in the matrix resin layer 1 in a three-dimensional manner, where the interparticle distance L is maintained to be greater than and equal to a certain value. Therefore, the LSPR absorption spectrum is sharp and stable, and the reproducibility and reliability are excellent. Therefore, the nanocomposite material 10 is applicable to various sensing devices such as a pressure sensor, a biosensor, a Surface Enhanced Raman Scattering (SERS) sensor, a Surface-enhanced Infrared Absorption (SEIRA) sensor, and a Near Field Scanning Optical Microscope (NSOM) sensor. By applying the nanocomposite material 10 to sensing device, high-precision detection can be performed with a simple structure. In addition, the nanocomposite material 10 can also be applied to other plasmon devices such as a photonic crystal device, an optical recording/playing device, an optical information processing device, an energy enhancement device, and a high-sensitivity photo diode.

In addition, the metal nanoparticle composite 10 is not only applicable to the field of using the local surface plasmon effect, but also applicable to various industrial fields such as electromagnetic shielding materials, magnetic noise-absorbing materials and high-thermal conductivity resin materials.

<Production Method>

A production method of the nanocomposite material 10 according to the embodiment is described hereinafter. The production of the nanocomposite material 10 includes: (1) a step of forming a resin film containing metal ions (or metal salts); (2) a reduction step, further including any step. Herein, the matrix resin layer 1 containing polyimide resin is taken as an example for exemplary description.

(1) Step of Forming the Resin Film Containing Metal Ions (or Metal Salts):

First, a polyamic acid resin film (or polyamic acid resin layer) containing metal ions (or metal salts) is prepared. The polyamic acid resin film (or polyamic acid resin layer) containing metal ions (or metal salts) may be prepared through the following film casting method or alkali modification method.

Film Casting Method

The film casting method is a method of casting a polyamic acid resin solution containing polyamic acid resin on any substrate to form a polyamic acid resin film, and the polyamic acid resin film containing metal ions (or metal salts) may be formed through any one of the following methods (I) to (III).

(I) a method of casting a coating liquid containing polyamic acid and a metal compound on any substrate to form a polyamic acid resin film containing metal ions (or metal salts);

(II) a method of casting a polyamic acid resin solution without any metal ions (or metal salts) on any substrate to form a polyamic acid resin film, and impregnating the polyamic acid resin film in a solution containing metal ions (or metal compound) (recorded as metal ion solution hereinafter); and (III) a method of impregnating the polyamic acid resin film containing metal ions (or metal salts) formed by the method (I) in the metal ion solution.

In the film casting method, the thickness of the matrix resin layer 1 is easy to control, and the chemical structure of the polyimide resin is not limited, which facilitates the application of the method. In view of the above aspects, the film casting method is more preferable than the following alkali modification method.

The method (I) has the following advantages: the content of the metal compound in the polyamic acid resin solution can be easily adjusted, and therefore, the metal content in the nanocomposite material 10 can be easily adjusted; or, the nanocomposite material 10 containing larger metal nanoparticles 3 with particle diameters D of greater than 30 nm can be easily fabricated. That is, the method (I), the particle diameters D may be controlled in the range of 30 nm to 100 nm.

The method (II) has the following advantages: since the polyamic acid resin film is impregnated with the metal ions (or metal compound) that are uniformly dissolved, and the metal ions (or metal salts) are uniformly dispersed in the polyamic acid resin film with less variation; so the nanocomposite material 10 containing metal nanoparticles 3 with smaller particle diameter distribution can be fabricated.

When the nanocomposite material 10 is stripped from the substrate and applied to a sensor or when the substrate is attached with the nanocomposite material 10 and the light-reflecting LSPR is used, the substrate used in the film casting method is not particularly limited. When the substrate is attached with the nanocomposite material 10 and the light-reflecting LSPR is used, the substrate is preferably light-transmissive, and may be, for example, a glass substrate or a substrate made of transparent synthetic resin. The transparent synthetic resin may be, for example, a polyimide resin, a PET resin, an acrylic acid resin, Methyl methacrylate-Styrene (MS) resin, Methyl methacrylate-Butadiene-Styrene (MBS) resin, Acrylonitrile-Butadiene-Styrene (ABS) resin, a polycarbonate resin, a siloxane resin, an epoxy resin.

The well-known polyamic acid resin obtained from well-known anhydride and diamine may be used as a polyimide resin precursor, namely, polyamic acid resin (referred to as "precursor" hereinafter). The polyamic acid may be obtained by dissolving, for example, equimolar amount of tetracarboxylic dianhydride and diamine in an organic solvent, and stirring for about 30 min to 24 hours at a temperature in the range of 0° C. to 100° C. for polymerization. During the reaction, the obtained polyamic acid resin is preferably in the range of 5 wt % to 30 wt % in the organic solvent, and more preferably in the range of 10 wt % to 20 wt % to dissolve the reaction components. The organic solvent used in the polymerization is preferably a polar organic solvent, and may be, for example, N,N-dimethylformamide, N,N-dimethylacetyl acetamide (DMAc), N-methyl-2-pyridinone, 2-butanone, dimethylsulfoxide, dimethyl sulfate, cyclohexanone, dioxane, tetrahydrofuran, diethylene glycol dimethyl ether, triethylene glycol dimethyl ether. Two or more of the solvents may be used in combination; and in addition, some aromatic hydrocarbons such as xylene and toluene may be used.

The synthesized polyamic acid resin is made into a solution for use, and preferably, made into a reaction solvent solution for use, which may be optionally concentrated, diluted or replaced by other organic solvents. The solution prepared in this manner may be used as a coating liquid after the metal compound is added.

The polyamic acid resin is preferably selected to enable the imidized polyimide resin to contain a thermoplastic or low-thermal expansion polyimide resin. Besides, the polyimide resin may include, for example, heat-resistant resins containing a polymer having an imide group in the structure, such as polyimide, polyamide imide, polybenzimidazole, polyimide ester, polyether imide, and polysiloxane imide.

Preferably, diamine used for preparing the polyamic acid resin may be, for example, 2,2'-bis(trifluoromethyl)-4,4'-diaminodiphenyl, 4,4'-diaminodiphenyl ether, 2'-methoxyl-4, 4'-diaminobenzoylaniline, 1,4-bis(4-aminophenoxy)benzene, 1,3-bis(4-aminophenoxy)benzene, 2,2-bis[4-(4-aminophenoxy)phenyl]propane, 2,2'-dimethyl-4,4'-diaminodiphenyl, 3,3'-dyhydroxyl-4,4'-diaminodiphenyl, and 4,4'-diaminobenzoylaniline. In addition, preferably, the dimine may be, for example, 2,2-bis[4-(3-aminophenoxy)phenyl]propane, bis[4-(4-aminophenoxy)phenyl]sulphone, bis[4-(3-aminophenoxy)phenyl]sulphone, bis[4-(4-aminophenoxy)]biphenyl, bis[4-(3-aminophenoxy)biphenyl, bis[1-(4-aminophenoxy)]biphenyl, bis[1-(3-aminophenoxy)]biphenyl, bis[4-(4-aminophenoxy)phenyl]methane, bis[4-(3-aminophenoxy)phenyl]methane, bis[4-(4-aminophenoxy)phenyl]ether, bis[4-(3-aminophenoxy)phenyl]ether, bis[4-(4-aminophenoxy)]benzophenone, bis[4-(3-aminophenoxy)]benzophenone, bis[4,4'-(4-aminophenoxy)]benzanilide, bis[4,4'-(3-aminophenoxy)]benzanilide, 9,9-bis[4-(4-aminophenoxy)phenyl]fluorene, and 9,9-bis[4-(3-aminophenoxy)phenyl]fluorene.

Other types of diamine may be, for example, 2,2-bis-[4-(4-aminophenoxy)phenyl]hexafluoropropane, 2,2-bis-[4-(3-aminophenoxy)phenyl]hexafluoropropane, 4,4'-methylenedi-o-toluidine, 4,4'-methylenebis(2,6-dimethylaniline), 4,4'-methylene-2,6-diathylanilin, 4,4'-diaminodiphenylpropane, 3,3'-diaminodiphenylpropane, 4,4'-diaminodiphenylethane, 3,3'-diaminodiphenylethane, 4,4'-diaminodiphenylmethane, 3,3'-diaminodiphenylmethane, 4,4'-diaminodiphenylthioether, 3,3'-diaminodiphenylthioether, 4,4'-diaminodiphenylsulphone, 3,3'-diaminodiphenylsulphone, 4,4'-diaminodiphenyl ether, 3,3-diaminodiphenyl ether, 3,4'-diaminodiphenyl ether, benzidine, 3,3'-diaminodiphenyl, 3,3'-dimethyl-4,4'-diaminodiphenyl, 3,3'-dimethoxybenzidine, 4,4"-diamino-p-terphenyl, 3,3"-diamino-p-terphenyl, m-phenylenediamine, p-phenylenediamine, 2,6-diaminopyridine, 1,4-bis(4-aminophenoxy)benzene, 1,3-bis(4-aminophenoxy)benzene, 4,4'-[1,4-phenylenebis(1-methylethylidene)]dianiline, 4,4'-[1,3-phenylenebis(1-methylethylidene)]dianiline, bis(4-amino-cyclohexyl)methane, bis(p-(β-amido-t-butylphenyl) ether, 1,4-bis(β-methyl-δ-aminopentyl)benzene, 1,4-bis(2-methyl-4-aminopentyl)benzene, 1,4-bis(1,1-dimethyl-5-aminopentyl)benzene, 1,5-diaminonaphthalene, 2,6-diaminonaphthalene, 2,4-bis(β-amido-t-butyl)toluene, 2,4-diaminotoluene, m-xylene-2,5-diamine, p-xylene-2,5-diamine, m-xylenediamine, p-xylenediamine, 2,6-diaminopyridine, 2,5-diaminopyridine, 2,5-diamino-1,3,4-oxadiazole, and pyrazine.

More preferably, the dimine component may be one or more selected from 2,2'-bis(trifluoromethyl)-4,4'-diaminobiphenyl) (TFMB), 1,3'-bis(4-aminophenoxy)-2,2-dimethylpropane) (DANPG), 2,2'-bis(4-aminophenoxy phenyl)propane (BAPP), 1,3-bis(3-aminophenoxy)benzene (APB), p-phenylene diamine (p-PDA), 3,4'-diaminodiphenyl ether (DAPE34), and 4,4'-diaminodiphenyl ether (DAPE44).

Preferably, anhydride used for preparing the polyamic acid resin may be, for example, pyromellitic dianhydride, 3,3',4,4'-biphenyltetracarboxylic anhydride, 3,3',4,4'-diphenylsulfone tetracarboxylic dianhydride, and 4,4'-oxydiphthalic dianhydride. In addition, preferably, anhydride may be, for example, 2,2',3,3'-benzophenonetetracarboxylic dianhydride, 2,3,3'4'-benzophenonetetracarboxylic dianhydride or 3,3',4,4'-benzophenonetetracarboxylic dianhydride, 2,3',3,4'-biphenyltetracarboxylic anhydride, 2,2'3,3'-biphenyltetracarboxylic anhydride, 2,3',3,4'-diphenylether tetracarboxylic dianhydride, and bis(2,3-dicarboxyl-phenyl)ether dianhydride. Further, preferably, anhydride may be, for example, 3,3",4,4"-p-terphenyltetracarboxylic dianhydride, 2,3,3",4"-p-terphenyltetracarboxylic dianhydride or 2,2",3,3"-p-terphenyltetracarboxylic dianhydride, 2,2-bis(2,3- or 3,4-dicarboxyl-phenyl)propane dianhydride, bis(2,3- or 3,4-dicarboxyl-phenyl)methane dianhydride, bis(2,3- or 3,4-dicarboxyl-phenyl)sulphone dianhydride, and 1,1-bis(2,3- or 3,4-dicarboxyl-phenyl)ethane dianhydride.

More preferably, anhydride may be one or more selected from pyromellitic dianhydride (PMDA), 3,3',4,4'-biphenyltetracarboxylic anhydride (BPDA), 3,3',4,4'-benzophenonetetracarboxylic dianhydride(BTDA), and 3,3',4,4'-diphenylsulfonetetracarboxylic dianhydride(DSDA).

The diamine and anhydride may be used alone, or two or more types of diamine and anhydride may be used in combination. In addition, other types of diamine and anhydride may also be used.

In this embodiment, in order to prepare the coating liquid containing the metal compound or the polyamic acid resin solution free of (without) metal ions (or metal salts), commercially available solutions containing polyamic acid resin sold may also be used. The polyamic acid solution to be used as a thermoplastic polyimide resin precursor may be, for example, thermoplastic polyamic acid resin vanish SPI-200N (product name) manufactured by Nippon Steel Chemical Co., Ltd., thermoplastic polyamic acid resin vanish SPI-300N (product name) manufactured by Nippon Steel Chemical Co., Ltd., thermoplastic polyamic acid resin vanish SPI-1000G (product name) manufactured by Nippon Steel Chemical Co., Ltd., and Torayneece#3000 (product name) manufactured by TORAY Co., Ltd. In addition, the polyamic acid solution to be used as a non-thermoplastic polyimide resin precursor may be, for example, non-thermoplastic polyamic acid resin vanish U-Varnish-A (product name) manufactured by UBE Industries Co., Ltd., and non-thermoplastic polyamic acid resin vanish U-Varnish-S (product name) manufactured by UBE Industries Co., Ltd.

When the nanocomposite material 10 is applied to applications that light-transmitting LSPR is used, the transparent or colorless polyimide resin is preferably a polyimide resin that does not easily form a complex due to intramolecular and intermolecular Charge Transfer (CT), and the transparent or colorless polyimide resin includes for example, an aromatic polyimide resin, an alicyclic polyimide resin, a fluorine-containing polyimide resin, and a silicon polyimide resin that have a large-volume and three-dimensional substituent group.

The large-volume and three-dimensional substituent group may be, for example, a fluorene skeleton or a diamantane skeleton. The large-volume and three-dimensional substituent group may be substituted by either of the anhydride residue and diamine residue in the aromatic polyimide resin, or be substituted by both the anhydride residue and diamine residue. The diamine having the large-volume and three-dimensional substituent group may be, for example, 9,9-bis (4-aminophenyl)fluorene.

The alicyclic polyimide resin refers to the resin formed by polymerized alicyclic anhydride and alicyclic diamine. In addition, the alicyclic polyimide resin may also be obtained by hydrogenating an aromatic polyimide resin.

The fluorine-containing polyimide resin is a resin formed by polymerized anhydride and/or diamine in which the monovalent elements bound to carbons of alkyl and phenyl are substituted by fluorine, perfluoroalkyl, perfluoroaryl, perfluoroalkoxy, and perfluorophenoxyl. In the fluorine-containing polyimide resin, all or a part of monovalent elements may be substituted by fluorine atoms, and the fluorine-containing polyimide resin in which at least 50% of the monovalent element are substituted by fluorine atoms is more preferred.

The silicon polyimide resin refers to a resin obtained by polymerizing silicon diamine and anhydride.

When the thickness of the transparent polyimide resin is 10 μm, the transmittance at a wavelength of 400 nm is greater than and equal to 80%, and the mean transmittance of visible light is greater than and equal to 90%.

Among the above polyimide resins, the fluorine-containing polyimide resin with excellent transmittance is preferred. The fluorine-containing polyimide resin may be the polyimide resin having the structure unit shown in General Formula (1). In General Formula (1), $Ar_1$ represents a tetravalent aromatic group shown in Formula (2), Formula (3), or Formula (4); $Ar_2$ represents a divalent aromatic group shown in Formula (6), Formula (7), or Formula (8); and p is the number of repeated structure units.

[Chemical Formula 1]

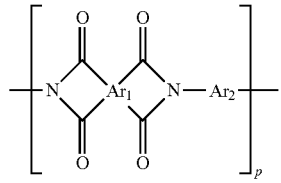

(1)

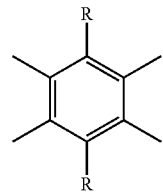

(2)

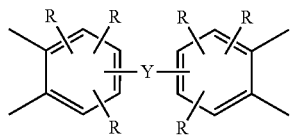

(3)

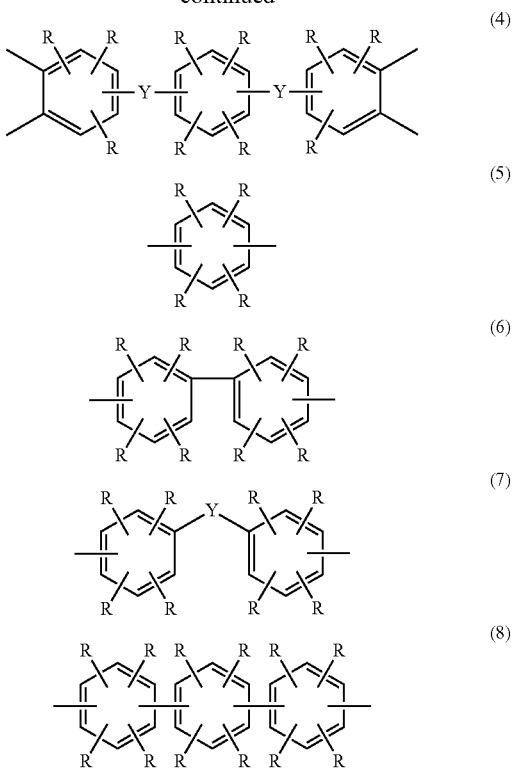

In addition, R independently represents fluorine atom or perfluoroalkyl; Y represents a divalent group shown in the following structural formula, $R_1$ represents perfluoroalkylene, and n refers to a number between 1 and 19.

[Chemical Formula 2]

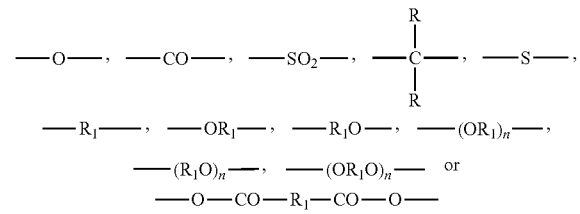

In the above General Formula (1), $Ar_2$ may be referred to as a diamine residue, and $Ar_1$ may be referred to as an anhydride residue. Therefore, diamine, anhydride or other equivalent tetracarboxylic acid, acid chloride, and ester (hereinafter recorded as "anhydride, etc.") are taken as examples of the preferred fluorine-containing polyimide resin. The fluorine-containing polyimide resin is not limited to the fluorine-containing polyimide resin obtained from the diamine and anhydride.

As the raw material of $Ar_2$, the diamine may be any diamine in which all intramolecular monovalent elements bound to carbons of alkyl and benzene rings except the amido are set to be fluorine or perfluoroalkyl, and may be, for example, 3,4, 5,6-tetrafluoro-1,2-phenylenediamine, 2,4,5,6-tetrafluoro-1, 3-phenylenediamine, 2,3,5,6-tetrafluoro-1,4-phenylenediamine, 4,4'-diaminooctafluorobiphenyl, bis(2,3,5,6-tetrafluoro-4-aminophenyl)ether, bis(2,3,5,6-tetrafluoro-4- aminophenyl)sulphone, hexafluoro-2,2-bistrifluoromethyl-4,4'-diaminodiphenyl, and 2,2-bis(trifluoromethyl)-4,4'-diaminodiphenyl.

As the raw material of $Ar_1$, the anhydride may be, for example, 1,4-difluorobenzenetetracarboxylic acid, 1-trifluoromethyl-4-fluorobenzenetetracarboxylic acid, 1,4-bis(trifluoromethyl)benzenetetracarboxylic acid, 1,4-bis(pentafluoroethyl)benzenetetracarboxylic acid, hexafluoro-3,3',4,4'-biphenyltetracarboxylic acid hexafluoro-3,3',4,4'-benzophenonetetracarboxylic acid, 2,2-bis(3,4-dicarboxylic trifluorophenyl)hexafluoropropane, 1,3-bis(3,4'-dicarboxylic trifluorophenyl)hexafluoropropane, 1,4-bis(3,4-dicarboxylic trifluorophenoxy)tetrafluoro benzene, hexafluoro-3,3',4,4'-oxydiphthalic acid, and 4,4'-(hexafluoroisopropylidene)biphenyltetracarboxylic acid.

The metal compound contained in the polyamic acid resin and the coating liquid prepared according to the method (I), or the metal compound contained in the metal ions (or metal compound) solution prepared according to the method (II) is not particularly limited and may be a compound containing the metal for forming the metal nanoparticles 3. The metal compound may be a salt or an organic carbonyl complex of the metal. The salt of the metal may be, for example, hydrochloride, sulfate, acetate, oxalate, and citrate. In addition, the organic carbonyl composite that can be used to form an organic carbonyl complex with the metal may be, for example, β-diketones such as acetylacetone, benzoylacetone, and dibenzoylmethane, or β-keto carboxylic esters such as ethyl acetoacetate.

Preferably, the metal compound maybe, for example, $H[AuCl_4]$, $Na[AuCl_4]$, $AuI$, $AuCl$, $AuCl_3$, $AuBr_3$, $NH_4[AuCl_4].n2H_2O$, $Ag(CH_3COO)$, $AgCl$, $AgClO_4$, $Ag_2CO_3$, $AgI$, $Ag_2SO_4$, $AgNO_3$, $Ni(CH_3COO)_2$, $Cu(CH_3COO)_2$, $CuSO_4$, $CuCl_2$, $CuBr_2$, $Cu(NH_4)_2Cl_4$, $CuI$, $CU(NO_3)_2$, $Cu(CH_3COCH_2COCH_3)_2$, $CoCl_2$, $CoCO_3$, $CoSO_4$, $Co(NO_3)_2$, $NiSO_4$, $NiCO_3$, $NiCl_2$, $NiBr_2$, $Ni(NO_3)_2$, $NiC_2O_4$, $Ni(H_2PO_2)_2$, $Ni(CH_3COCH_2COCH_3)_2$, $Pd(CH_3COO)_2$, $PdSO_4$, $PdCO_3$, $PdCl_2$, $PdBr_2$, $Pd(NO_3)_2$, $Pd(CH_3COCH_2COCH_3)_2$, $SnCl_2$, $IrCl_3$, and $RhCl_3$.

In the coating liquid containing the polyamic acid resin and the metal compound prepared according to the method (I), when a metal is used, a three-dimensional crosslinking reaction between metal ions generated by dissociation of the metal compound and the polyamic acid resin may occur. Therefore, the coating liquid may be tackified and gelated over time, and cannot be used as a coating liquid. In order to prevent the coating liquid from being tackified and gelated, a viscosity modifying agent is preferably added to the coating liquid to serve as a stabilizer. The viscosity modifying agent is added to prevent the metal ions in the coating liquid from forming a chelate complex with the polyamic acid resin; instead, the viscosity modifying agent forms a chelate complex with the metal ions. In this manner, the three-dimensional crosslinking between the polyamic acid resin and metal ions is prevented by using the viscosity modifying agent, thereby inhibiting tackifying and gelation.

The viscosity modifying agent may be selected from low-molecule organic compounds that are highly reactive to the metal ions (that is, capable of forming a metal complex). The molecular weight of the low-molecule organic compounds may be in the range of 50 to 300. Specifically, the viscosity modifying agent may be, for example, acetylacetone, ethyl acetoacetate, pyridine, imidazole, and methylpyridine. Besides, for forming 1 mole of chelate complex compound, the amount of the added viscosity modifying agent may be in the range of 1 mole to 50 moles, and more preferably, in the range of 2 moles to 20 moles.

Based on the total 100 parts by weight of the polyamic acid resin, the metal compound and the viscosity modifying agent, the formulation amount of the metal compound in the coating liquid is set to be in the range of 3 parts by weigh to 80 parts by weight, and more preferably, in the range of 20 parts by weigh to 60 parts by weight. In this case, if the metal compound is less than 3 parts by weight, the metal nanoparticles 3 are not fully precipitated, thereby failing to generate the surface plasmon resonance. If the metal compound is greater than 80 parts by weight, metal salts cannot be dissolved in the coating liquid and are precipitated, or the metal nanoparticles 3 are easily coagulated. Besides, the particle diameters D of the formed metal nanoparticles 3 may be greater than and equal to 100 nm, thereby failing to generate the LSPR.

In addition, in the coating liquid, an optional component other than the above components may be, for example, a formulation leveling agent, a defoaming agent, an adhesion imparting agent, and a crosslinking agent.

A method for coating the coating liquid containing a metal compound or the polyamic acid resin solution free of metal ions (or metal salts) is not particularly limited, and may be performed, for example, by using a scraper, a mould, a blade or a lip. Preferably, a spin coater, a gravure coater, or a rod coater that can be used to form a uniform coating film (or polyamic acid resin film) and easily control the thickness of matrix resin layer 1 with a high precision may be used.

Besides, in the metal ion solution used in the method (II), preferably, the concentration of the metal compound may be in the range of 30 mM to 300 mM, and more preferably, in the range of 50 mM to 100 mM. If the concentration of the metal compound is less than 30 mM, it takes a lot of time to impregnate the metal ion solution into the polyamic acid resin film, which is not desirable. If the concentration of the metal compound is greater than 300 mM, the surface of the polyamic acid resin film may be eroded (dissolved).

In addition to the metal compound, the metal ion solution may also contain other components such as a buffer for adjusting the pH value.

The impregnation method is not particularly limited, provided that the surface of the polyamic acid resin film can contact with the metal ion solution, and a well-known method, for example, a dipping method, a spraying method, a brush painting or printing method, may be adopted. Preferably, the impregnation temperature may be 0° C. to 100° C., and the impregnation temperature is a normal temperature close to 20° C. to 40° C. In addition, when the dipping method is adopted, the impregnation time is preferably 1 minute to 5 hours, and more preferably, 5 minutes to 2 hours. When the dipping time is less than 1 minute, the impregnation of the metal ion solution on the polyamic acid resin film is not sufficient. In another aspect, even if the dipping time exceeds 5 hours, the impregnation degree of the metal ion solution on the polyamic acid resin film tends to be stable.

After being coated with the coating liquid containing the metal compound or the polyamic acid resin solution free of metal ions (or metal salts) and dried, the polyamic acid resin film is formed. During drying, the temperature is controlled in a way that the imidization caused by ring-closing dehydration of the polyamic acid resin is not completed. The drying method is not particularly limited, and preferably, drying is performed at a temperature in the range of 60° C. to 200° C. for 1 minute to 60 minutes, and more preferably, drying is performed at a temperature in the range of 60° C. to 150° C. In the dried polyamic acid resin film, a part of the structure of the polyamic acid resin may be imidized; the imidization ratio is preferably set to be less than and equal to 50%, and more preferably, less than and equal to 20% of the structure of the polyamic acid resin, with at least 50% of the structure of the polyamic acid resin remained. In addition, the imidization rate of the polyamic acid resin is calculated by the absorbance of an imide group at 1,710 cm$^{-1}$ in an infrared absorption spectrum of the film through a transmission method by using a Fourier transform infrared spectrophotometer (commercially available, for example, FT/IR620 manufactured by Jasco Company, Japan), with the absorbance of a benzene ring carbon hydrogen bond at 1,000 cm$^{-1}$ as a reference.

The polyamic acid resin film may have a single layer, or may have a laminated structure including a plurality of polyamic acid resin films. The plurality of layers may be formed by coating other polyamic acid resins on the polyamic acid resin layers containing different components in sequence. When there are at least three polyamic acid resin layers, the polyamic acid resin containing the same components may be used two or more times. The simple structure of two layers or single layer, especially single layer, can be obtained in the industry.

In addition, the single or plurality of polyamic acid resin layers is laminated on a sheet-shaped support member. After the single or plurality of polyimide resin layers is formed through imidization once, the polyamic acid resin film may be further formed thereon. In this case, in order to improve the adhesion between the polyimide resin layer and the polyamic acid resin film layer, a surface treatment is preferably performed on the polyimide resin layer by using plasma. Through the surface treatment by using the plasma, the surface of the polyimide resin layer may be roughened, or the chemical structure of the surface may be changed. In this way, the wettability of the surface of the polyimide resin layer is improved, the affinity with the polyamic acid solution is improved, and the polyamic acid resin film can be maintained on the surface stably.

Alkali Modification Method

The alkali modification method is a method including modifying the surface of the polyimide film to form a polyamic acid resin layer, and then impregnating the metal ion solution into the polyamic acid resin layer. Besides, the used polyimide resin is the same as that in the film casting method, which is not described herein again.

The alkali modification method has the following advantages: the solution containing metal ions (or metal compound) uniformly dissolved is impregnated into the polyamic acid resin layer, and the metal ions (or metal salts) are uniformly dispersed in the polyamic acid resin layer with less variation. Therefore, the method has the following advantages: a nanocomposite material 10 containing metal nanoparticles 3 with a small particle diameter distribution can be fabricated; an integrated nanocomposite material 10 closely adhered to the substrate of the polyimide film can be fabricated; when the nanocomposite material 10 is fabricated on the surface side of the polyimide film, the nanocomposite material 10 can also be fabricated at the rear side of the polyimide film through the same steps; or the metal ions in the metal ion solution can easily be exchanged with ions of a salt derived from an alkali metal from the alkali aqueous solution and a carboxyl group at the terminal of the polyimide resin (which can shorten the impregnation time).

Preferably, the alkali aqueous solution for treating the polyimide film may be an alkali aqueous solution of sodium hydroxide or potassium hydroxide with a concentration in the range of 0.5 wt % to 50 wt % at a liquid temperature in the range of 5° C. to 80° C. The alkali aqueous solution may be applied by a dipping method, spraying method or brush coating, and so on. For example, when the dipping method is adopted, treating the polyimide film with the alkali aqueous solution for 10 seconds to 60 minutes is effective. Preferably, the alkali aqueous solution with a concentration in the range of 1 wt % to 30 wt % at a liquid temperature in the range of 25° C. to 60 is used to treat the surface of the polyimide film for 30 seconds to 10 minutes. The treatment condition of the polyimide film may be changed according to the structure of the polyimide film. Usually, when the concentration of the alkali aqueous solution is low, the treatment time of the polyimide film may be increased. Besides, if the liquid temperature of the alkali aqueous solution is raised, the processing time is shortened.

If the alkali aqueous solution is used for treatment, the alkali aqueous solution is permeated at the surface side of the polyimide to modify the polyimide resin. It is generally considered that the modification reaction caused by the alkali treatment is the hydrolysis of the imide bond. The thickness of the alkali treatment layer formed by the alkali treatment is preferably in the range of 1/5000 to 1/2, and more preferably 1/3000 to 1/5, of the thickness of the polyimide film. In addition, from another point of view, the thickness of the alkali treatment layer is preferably in the range of 0.005 µm to 3.0 µm, more preferably 0.05 µm to 2.0 µm, and further more preferably from 0.1 µm to 1.0 µm. Setting the thickness in the range is beneficial to the formation of the metal nanoparticles 3. If the thickness of the alkali treatment layer is lower than the lower limit (0.005 µm), it is difficult to sufficiently impregnate the metal ions. In another aspect, when the polyimide resin is treated with the alkali aqueous solution, the imide ring of the polyimide resin is opened, and meanwhile the outmost surface portion of the polyimide resin tends to be dissolved. Therefore, it is difficult to exceed the upper limit (3.0 µm).

For the ease of modification of the polyimide film by using the alkali aqueous solution, a polyimide film with high water absorption rate is an ideal selection for the polyimide film. The water absorption rate of the polyimide film is preferably higher than 0.1%, and more preferably, higher than 0.2%. The water absorption rate is undesirably less than 0.1% because modification cannot be fully performed or the modification time needs to be prolonged to a sufficient value.

Besides, since the polyimide film varies as the chemical structure of the polyimide resin that forms the polyimide film varies, the degree of the modification treatment by using the alkali aqueous solution may be different, so a polyimide film on which the modification treatment can be easily be performed is preferred. The polyimide film on which the modification treatment by using the alkali aqueous solution can be easily performed may be, for example, a polyimide film having an ester bond in the structure of the polyimide resin or a polyimide film in which pyromellitic dianhydride is used as a monomer derived from anhydride (relative to 100 moles of the anhydride component, 50 is preferred, and 60 mole is more preferred).

According to different applications, both surfaces of the polyimide film may be modified through alkali treatment at the same time. The alkali treatment is especially effective to the polyimide resin layer containing low-thermal expansion polyimide resin, and thus being preferred. The low-thermal expansion polyimide resin has good adaptability (wettability) with the alkali aqueous solution, and thus easily undergoes a ring-opening reaction of the imide ring induced by the alkali treatment.

A salt derived from an alkali metal from the alkali aqueous solution and the carboxyl group at the terminal of the polyimide resin may be formed in the alkali treated layer. Through the impregnation treatment of the metal ion solution in the subsequent metal ion solution impregnation step, the alkali metal salt of the carboxyl group may be replaced by a metal ion salt, so it is acceptable that metal ion salt is present before the metal ion solution impregnation step. Besides, an acid aqueous solution may be used to neutralize the basic surface layer of the polyimide resin. Any acid aqueous solution may be used, provided that the aqueous solution is acidic, and hydrochloric acid aqueous solution or sulfuric acid aqueous solution is preferred. Besides, the concentration of the acid aqueous solution is preferably in the range from 0.5 wt % to 50 wt %, and more preferably, in the range from 0.5 wt % to 5 wt %. Preferably, the pH value of the acid aqueous solution is preferably set to be lower than 2. Preferably, after being washed with an acid aqueous solution, the polyimide film is washed by water and dried, and then is subjected to the subsequent metal ion solution impregnation step.

The polyimide film for forming the alkali modification layer is impregnated with the metal ion solution, and is dried to form a layer containing metal ions (or metal salts). Through the impregnation treatment, the carboxyl group in the alkali modification layer is converted into a carboxyl metal salt.

The metal ions, the metal compound and the metal ion solution used in the impregnation step may be the same as the metal ions, the metal compound and the metal ion solution used in the impregnation step in the film casting method.

The impregnation method is not particularly limited, provided that the surface of the alkali modification layer can contact with the metal ion solution, and well-known methods may be adopted, for example, a dipping method, a spraying method, a brush painting or printing method, may be used. Preferably, the impregnation temperature may be in the range of 0° C. to 100° C., and the impregnation temperature is a normal temperature close to 20° C. and 40° C. In addition, when the dipping method is adopted, the impregnation time is preferably 1 minute to 5 hours, and more preferably, 5 minutes to 2 hours.

Drying is performed after impregnation. The drying method is not particularly limited, and may be, for example, natural drying, blowing drying by using an air gun, or drying by using an oven. The drying is performed at 10° C. to 150° C. for 5 seconds to 60 minutes, preferably at 25° C. to 150° C. for 10 seconds to 30 minutes, and more preferably at 30° C. to 120° C. for 1 minute to 10 minutes.

In the "polyamic acid resin film or polyamic acid resin layer containing metal ions or metal salts" (hereinafter referred to as the "polyamic acid layer containing metal ions") formed through the film casting method or alkali modification method, the metal ions may interact with the carboxyl of the polyamic acid and be attached to the carboxyl group, or a complex may be formed. Such phenomenon takes effect by homogenizing the concentration distribution of the metal ions in the polyamic acid layer containing the metal ions. Therefore, non-uniform distribution or coagulation of the metal nanoparticles 3 precipitated in the matrix resin layer 1 is prevented, and the metal nanoparticles 3 having uniform shapes are precipitated with uniform distribution.

(2) Reduction Step

In the reduction step, heat treatment is performed on the polyamic acid layer containing metal ions obtained in the foregoing manners, preferably at a temperature of higher than 140° C., and more preferably in the range of 160° C. and 450° C., and still more preferably in the range of 200° C. and 400° C., so that the metal ions (or metal salts) are reduced and the metal nanoparticles 3 are precipitated. If the temperature of the heat treatment is lower than 140° C., the metal ions (or metal salts) are not fully reduced, and it is difficult to set the mean particle diameter of the metal nanoparticles to be greater than and equal to the lower limit (3 nm). Besides, if the temperature of the heat treatment is lower than 140° C., heat diffusion of the metal nanoparticles 3 precipitated through reduction in the matrix resin layer 1 may be not sufficient. Further, if the temperature of the heat treatment is lower than 140° C., when a polyimide resin is used as the matrix resin layer 1, the polyamic acid resin, as a polyimide resin precursor, may not be fully imidized, and the imidizing step needs to be performed again by heating. In another aspect, if the temperature of the heat treatment exceeds 450° C., the matrix resin layer 1 may be decomposed due to heat, and along with the decomposition of the matrix resin layer 1, new absorption other than the absorption from the LSPR may be easily resulted; or the spacing between adjacent metal nanoparticles 3 may be decreased. As a result, the adjacent metal nanoparticles 3 may interact with each other, leading to a wider LSPR absorption spectrum.

The heat treatment time may be determined according to a target interparticle distance, the temperature of the heat treatment, and the content of the metal ions (or metal salts) in the polyamic acid layer containing metal ions. For example, if the temperature of the heat treatment is 200° C., the heat treatment time may be set to be in the range of 10 minutes to 180 minutes; if the temperature of the heat treatment is 400° C., the heat treatment time may be set to be in the range of 1 minute to 60 minutes.

The particle diameters D and the interparticle distance L of the metal nanoparticles 3 may be controlled by the heating temperature and the heating time in the reduction step, and the content of the metal ions (or metal salts) in the matrix resin layer 1 (or a precursor resin layer thereof). The inventors of the present invention have the following viewpoint: if the heating temperature and heating time in the heat-reduction are fixed, and the absolute content of the metal ions (or metal salts) in the matrix resin layer 1 (or in the precursor resin layer thereof) varies, the particle diameters D of the precipitated metal nanoparticles 3 vary. In addition, the inventors also have the following viewpoint: when the heating temperature and heating time of the heating-reduction are not controlled, the interparticle distance L may be less than a particle diameter $D_L$ of a larger one of two adjacent metal nanoparticles, or the metal nanoparticles 3 are coagulated on the surface of the matrix resin layer 1 to form islands.

Based on the viewpoints, the particle diameters D of the metal nanoparticles 3 may be controlled by controlling the heating temperature; the interparticle distance L may be controlled by controlling the heating time. These points of view are specifically illustrated based on examples. For example, in the polyamic acid resin layer (a resin layer of the matrix resin precursor) with a thickness of 200 nm, heat-reduction is performed on gold ions with a content of 18 wt % per cubic centimeter (5.2 μg per square centimeter), and the particle diameters D and the interparticle distance L of the metal gold nanoparticles formed through heating-reduction vary with the heating temperature and heating time. That is, the particle diameters D are about 9 nm (the mean particle diameter is about 9 nm) when the treatment is performed for 10 minutes at 200° C.; the particle diameters D are about 13 nm (the mean particle diameter is about 13 nm) when the treatment is performed for 3 minutes at 300° C.; and the particle diameters D are about 15 nm (the mean particle diameter is about 15 nm) when the treatment is performed for 1 minute at 400° C. In any case, the nanocomposite material is formed under the condition that the spacing between adjacent metal gold nanoparticles is greater than and equal to the particle diameter of a larger one of the adjacent metal gold nanoparticles (which is approximately close to the particle diameter D).

In addition, by applying the above viewpoints, the heat treatment in the reduction step may also be divided into a plurality of steps. For example, the following steps may be performed: a particle diameter control step of controlling the metal nanoparticles 3 to grow to a specified particle diameters D at a first heating temperature, and an interparticle distance control step of maintaining the interparticle distance L of the metal nanoparticles 3 until the interparticle distance L reaches a specified range at a second heating temperature which is the same as or different from the first heating temperature. In this manner, the particle diameters D and the interparticle distance L may be controlled more precisely by adjusting the first and second heating temperatures as well as the heating time.

The heating-reduction is adopted as the reduction method because the heating-reduction has the following industrial advantages: the particle diameters D and the interparticle distance L can be easily controlled by controlling the treatment conditions of reduction (especially the heating temperature and heating time); or simple devices may be used in the lab scale to production scale without any limitation. Moreover, the heating-reduction can be applied to single or continuous mode without any specific research. The heating-reduction may be carried out in an inert gas atmosphere such as Ar and $N_2$, or in vacuum or atmosphere of 1 KPa to 5 KPa. The gas-phase reduction using reducing gases such as hydrogen or photo-reduction (ultraviolet) is undesirably used as the reduction method. In gas-phase reduction, no metal nanoparticles 3 is formed near the surface of the matrix resin layer 1, and the reducing gas promotes thermal decomposition of the matrix resin; therefore, it is difficult to control the particle spacing of the metal nanoparticles 3. In addition, in photo-reduction, due to the transmittance of the matrix resin layer 1, the metal nanoparticles 3 near the surface and those in the deep portion may have non-uniform densities; therefore, it is difficult to control the particle diameters D and interparticle distance L of the metal nanoparticles 3, and the reduction efficiency is low.

In the reduction step, the imidization of the polyamic acid may be conducted by using the heat in the reduction treatment, and therefore, the steps from precipitation to imidization of the metal nanoparticles 3 may be carried out by a one-pot process, thereby simplifying the production steps.

In the heating-reduction, the metal ions (or metal salts) in the matrix resin layer 1 (or the precursor resin layer thereof) are reduced, and the metal nanoparticles 3 are independently precipitated by means of heat diffusion. The metal nanoparticles 3 thus formed maintaining an interparticle distance L greater than and equal to a certain value, and have shapes that are substantially uniform, and the metal nanoparticles 3 are uniformly dispersed in the matrix resin layer 1 in a three-dimensional manner Especially, when the metal ions (or metal salts) in the polyamic acid resin layer containing metal ions are adsorbed on the carboxyl group of the polyamic acid resin, or a complex is formed, the shapes or particle diameters D of the metal nanoparticles 3 are homogenized, so that a nanocomposite material 10 in which the metal nanoparticles 3 are uniformly precipitated and dispersed in the matrix resin layer 1 with the basically uniform interparticle distance L is obtained. In addition, by controlling resin structure units that form the matrix resin 1 or controlling the absolute amount of the metal ions (or metal salts) and the volume fraction of the metal nanoparticles 3, the particle diameters D of the metal nanoparticles 3 and the distribution state of the metal nanoparticles 3 in the matrix resin layer 1 may also be controlled.

As described above, the nanocomposite material 10 having the structure shown in FIG. 1 can be produced. In addition, when resins other than the polyimide resin (polyamic acid) are used as the matrix resin layer 1, the foregoing production method may also be used.

In addition, during the production of the nanocomposite material 10, except the steps (1) and (2), any steps such as the following etching step and patterning step may be performed.

Etching Step

In the etching step, a part of the metal nanoparticles 3 in the matrix resin layer 1 of the nanocomposite material 10 may be exposed from the surface of the matrix resin layer 1. For example, in the nanocomposite material 10, the surface of a side where the metal nanoparticles 3 are required to expose is removed by etching. The etching method may be, for example, a wet etching method using a hydrazide solution or an alkali solution, or a dry etching method using plasma treatment.

In the wet etching method, for example, for higher permeability of the etching solution, the desirable matrix resin adopted in the etching using an alkali solution may be a matrix resin with a high water absorption rate, where the water absorption rate is preferably higher than 0.1%, and more preferably, higher than 0.2%.

In the dry etching method, for example, for higher reactivity with gases in a plasma state, the desirable matrix resin adopted in the etching using plasma may be a matrix resin containing halogen atoms, and a polar group such as —OH, —SH, —O—, —S—, —SO—, —NH—, —CO—, —CN, —P=O, —PO—, —$SO_2$—, —CONH—, and —$SO_3H$. In addition, from another point of view, like the etching using an alkali solution, the matrix resin with a high water absorption rate is desirable, where the water absorption rate is preferably higher than 0.1%, and more preferably, higher than 0.2%.

Patterning Step

The patterning may be implemented through a combination of a photolithography technology and etching, and performed in the following sequence. First, a substrate formed by laminating the nanocomposite material 10 on any substrate is prepared. The foregoing substrate may be used as the substrate herein. A resist liquid is coated on the nanocomposite material 10 and dried to form a resist layer. Then, a mask with a specified pattern is used to expose the resist layer, and development is performed, so that a pattern is formed on the resist layer on the nanocomposite material 10. The resist layer formed with the pattern is used as a shielding, and a part of the nanocomposite material 10 not shielded by the etching resist layer is removed through a method the same as that of the etching step. The etching is performed until the substrate is exposed. Then, the resist layer is removed to obtain the patterned nanocomposite material on the substrate. The patterned nanocomposite material is preferably used in multi-channel sensing devices, and applied in such as plasmon waveguide for displaying LSPR microstructures or micro-optical components.

In addition, both the etching step and patterning step may be performed, and in this case, the patterning step may be performed after the etching step, or the etching step is performed after the patterning step.

[Second Embodiment]

The second embodiment of the present invention is described in detail hereinafter. In a production method of a metal nanoparticle composite of this embodiment, a metal nanoparticle composite, in which metal nanoparticles with a mean particle diameter in the range of 20 nm to 30 nm in a polyimide resin do not contact each other and are independently (preferably completely independently) dispersed, is produced, and the method includes the following Step A and Step B. The polyamic acid resin, as a precursor of the polyimide resin, is used as a subject of the polyimide resin, in which the polyamic acid resin is heated, so as to be dehydrated and imidized through a cyclization reaction. Compared with other synthetic thermosetting resin such as an epoxy resin, a phenolic resin, and an acrylic resin, the polyimide resin has excellent properties of heat resistance and dimensional stability, and is thus preferred. In addition, heat treatment is performed when the metal nanoparticles are formed, so the polyimide resin is advantageous in being capable of withstanding a temperature of 160° C. or higher.

[Step A: Formation of a Coating Film]

In the production method of a metal nanoparticle composite of this embodiment, a coating liquid containing a polyamic acid resin and a metal compound is coated on a substrate and dried, to form a coating film.

The substrate used in Step A is not particularly limited, and may be, for example, a polyimide resin film (sheet) such as a metal foil, a glass plate, a resin film or ceramic. The metal nanoparticle composite produced through the production method according to the present invention may be stripped from the substrate and or be attached to the substrate. When the substrate is attached to the metal nanoparticle composite produced in the present invention and the light-transmitting LSPR is used, the substrate is preferably light-transmissive, for example, a glass substrate, or a substrate made of transparent synthetic resin can be used. The transparent synthetic resin may be, for example, a polyimide resin, a PET resin, an acrylic acid resin, an MS resin, an MBS resin, an ABS resin, a polycarbonate resin, a silicone resin, a siloxane resin, and an epoxy resin.

Well-known polyamic acid resin obtained from well-known anhydride and diamine may be used as the polyimide resin precursor, namely, a polyamic acid resin. The polyamic acid may be obtained by dissolving equimolar amount of tetracarboxylic dianhydride and diamine in an organic solvent, and stirring for about 30 minutes to 24 hours at a temperature in the range of 0° C. to 100° C. for polymerization. During the reaction, the obtained polyamic acid resin is preferably in the range of 5 wt % to 30 wt % in the organic solvent, and more preferably in the range of 10 wt % to 20 wt %, to dissolve the reaction components. The organic solvent used in the polymerization is preferably a polar organic solvent, and may be, for example, N,N-dimethylformamide, DMAc, N-methyl-2-pyridinone, 2-butanone, dimethylsulfoxide, dimethyl sulfate, cyclohexanone, dioxane, tetrahydrofuran, diethylene glycol dimethyl ether, triethylene glycol dimethyl ether, and so on. Two or more of the solvents may be used in combination; and in addition, some aromatic hydrocarbons such as xylene and toluene may be used.

The synthesized polyamic acid resin is made into a solution for use, and preferably, made into a reaction solvent solution for use, which may be optionally concentrated, diluted or replaced by other organic solvents. The solution prepared in this manner may be used as a coating liquid after the metal compound is added.

The polyamic acid resin is preferably selected to enable the imidized polyimide resin to contain a thermoplastic or low-thermal expansion polyimide resin. Besides, the polyimide resin may include, for example, heat-resistant resin containing a polymer having an imide group in the structure, such as polyimide, polyamide imide, polybenzimidazole, polyimide ester, polyetherimide, and polysiloxane imide.

In this embodiment, preferably, diamine used for preparing the polyamic acid resin may be the same as the diamine in the first embodiment.

In this embodiment, preferably, anhydride used for preparing the polyamic acid resin may be the same as the anhydride in the first embodiment.

The diamine and anhydride may be used alone, or two or more types of diamine and anhydride may be used in combination. In addition, other types of diamine and anhydride may also be used.

In this embodiment, in order to prepare the polyamic acid resin solution, a commercially available product may be used as a solution containing a polyamic acid resin. The thermoplastic polyimide resin solution may be, for example, thermoplastic polyamic acid resin vanish SPI-200N (product name) manufactured by Nippon Steel Chemical Co., Ltd., thermoplastic polyamic acid resin vanish SPI-300N (product name) manufactured by Nippon Steel Chemical Co., Ltd., thermoplastic polyamic acid resin vanish SPI-1000G (product name) manufactured by Nippon Steel Chemical Co., Ltd., and Torayneece#3000 (product name) manufactured by TORAY Co., Ltd. In addition, the non-thermoplastic polyimide resin solution may be, for example, non-thermoplastic polyamic acid resin vanish U-Varnish-A (product name) manufactured by UBE Industries Co., Ltd., and non-thermoplastic polyamic acid resin vanish U-Varnish-S (product name) manufactured by UBE Industries Co., Ltd.

When the nanocomposite material produced in the present invention is applied to applications that light-transmitting LSPR is used, the transparent or colorless polyimide resin is preferably a polyimide resin that does not easily form a complex due to intramolecular and intermolecular Charge Transfer (CT), for example, an aromatic polyimide resin, an alicyclic polyimide resin, a fluorine-containing polyimide resin, and a silicon polyimide resin that have a large-volume and three-dimensional substituent group. Polyimide resin that is the same as that of the first embodiment may be used.

The metal compound contained in the polyamic acid resin and the coating liquid is not particularly limited, provided that metal in particle shape can be precipitated from the metal compound by heating-reducing the metal ions (or metal salts) in the polyamic acid resin, and the metal compound may be, for example, metal compound containing a precursor such as gold (Au), silver (Ag), copper (Cu), cobalt (Co), nickel (Ni), palladium (Pd), platinum (Pt), tin (Sn), rhodium (Rh), iridium (Ir). In addition, the metal compounds can be used alone, or two or more of the metal compounds may be used in combination. For example, preferred metals that can produce LSPR may be, for example, gold (Au), silver (Ag), copper (Cu), palladium (Pd), platinum (Pt), tin (Sn), rhodium (Rh), and iridium (Ir). More preferably, the metal compound that can be used in the production method of the present invention may be a compound of gold (Au) or silver (Ag). The metal compound may be a salt or an organic carbonyl complex of the metal. The salt of the metal may be, for example, hydrochloride, sulfate, acetate, oxalate, and citrate. In addition, the organic carbonyl composite that can be used to form an organic carbonyl complex with the metal may be, for example, β-diketones such as acetylacetone, benzoylacetone, and dibenzoylmethane, or β-keto carboxylic esters such as ethyl acetoacetate.

A preferable example of the metal compound is the same as that in the first embodiment.

When a metal is used, a three-dimensional crosslinking reaction between metal ions generated by the dissociation of the metal compound and the polyamic acid resin may occur. Therefore, the coating liquid may be tackified and gelated over time, and cannot be used as a coating liquid. In order to prevent the coating liquid from being tackified and gelated, a viscosity modifying agent is preferably added to the coating liquid to serve as a stabilizer. The viscosity modifying agent is added to prevent the metal ions in the coating liquid from forming a chelate complex with the polyamic acid resin; instead, the viscosity modifying agent forms a chelate complex with the metal ions. In this manner, the three-dimensional crosslinking between the polyamic acid resin and metal ions is prevented by using the viscosity modifying agent, thereby inhibiting tackifying and gelation. The viscosity modifying agent may be the same as that in the first embodiment.

Based on the total 100 parts by weight of the solid contents of the polyamic acid resin and the metal compound, the formulation amount of the metal compound in the coating liquid is set to be in the range of 3 parts by weight to 80 parts by weight, and more preferably, in the range of 10 parts by weight to 60 parts by weight. In this case, if the metal compound is less than 3 parts by weight, it is difficult to set the mean particle diameter of the metal nanoparticles to be greater than and equal to 20 nm. If the metal compound is greater than 80 parts by weight, metal salts that cannot be dissolved in the coating liquid and are precipitated, or the metal nanoparticles are easily to be coagulated. The mean particle diameter herein refers to a mean value of the diameters (a median diameter) of the metal nanoparticles, and is set to a measured area mean diameter of any 100 nanoparticles. The mean particle diameter may be determined through observation by using a TEM.

In addition, in the coating liquid, an optional component other than the above components may be, for example, a formulation leveling agent, a defoaming agent, an adhesion imparting agent, and a crosslinking agent.

A method for coating the coating liquid containing a metal compound is not particularly limited, and may be performed, for example, by using a scraper, a mould, a blade or a lip. Preferably, a spin coater, a gravure coater, or a rod coater that can be used to form a uniform coating film and control the thickness of the coating film with a high precision easily may be used. The coating liquid is coated on the substrate, in which the content of the metal component from the metal compound (referred to as metal component hereinafter) may be in the range of 1 $\mu g/cm^2$ to 30 $\mu g/cm^2$, preferably in the range of 1.5 $\mu g/cm^2$ to 25 $\mu g/cm^2$, and more preferably in the range of 2 $\mu g/cm^2$ to 25 $\mu g/cm^2$. The amount of the metal per unit area of the coating film obtained through coating may be controlled by the film thickness of the coating liquid after the content of the metal component in the coating liquid is predetermined, or may be controlled by the content of the metal component in the coating liquid when the film thickness of the coating film is predetermined. The film thickness of the coating liquid after drying is set to be in the range of 30 nm to 1.7 $\mu m$, preferably in the range of 30 nm to 1 $\mu m$, and more preferably from 50 nm to 500 nm; and moreover, the thickness of the imidized polyimide resin layer is set to be in the range of 25 nm to 1 $\mu m$, preferably in the range of 25 nm to 600 nm, and more preferably in the range of 30 nm to 300 nm. If the thickness of the imidized polyimide resin layer is less than 25 nm, the thickness of the polyimide resin layer or the particle diameters of the metal nanoparticles may be non-uniform, so it is difficult to control the mean particle diameter. In another aspect, if the thickness of the imidized polyimide resin layer is greater than 1 $\mu m$, the metal nanoparticles formed in the polyimide resin tend to get smaller, and the mean particle diameter of the metal nanoparticles in the surface portion of the polyimide resin layer and that of the metal nanoparticles in the deep portion of the polyimide resin layer tend to be non-uniform.

The coating liquid containing a metal compound is coated and dried to form the coating film. During drying, the temperature is preferably controlled in a way that the imidization caused by ring-closing dehydration of the polyamic acid resin is not completed. The drying method is not particularly limited, and preferably, drying is performed at a temperature in the range of 60° C. to 200° C. for 1 minute to 60 minutes, and more preferably, drying is performed at a temperature in the range of 60° C. to 150° C. In the dried coating film, a part of the structure of the polyamic acid resin may be imidized; the imidization ratio is preferably set to be less than and equal to 50%, and more preferably, less than and equal to 20% of the structure of the polyamic acid resin, with at least 50% of the structure of the polyamic acid resin remained. In addition, the imidization ratio of the polyamic acid resin is calculated by the absorbance of an imide group at 1,710 $cm^{-1}$ in an infrared absorption spectrum of the film through a transmission method using a Fourier transform infrared spectrophotometer (commercially available, for example, FT/IR620 manufactured by Jasco Company, Japan), with the absorbance of a benzene ring carbon hydrogen bond at 1,000 $cm^{-1}$ as a reference.

The coating film may have a single layer, or may have a laminated structure including a plurality of coating films. The plurality of layers may be formed by coating other polyamic acid resins on the polyamic acid resin layers containing different components in sequence. When there are at least three polyamic acid resin layers, the polyamic acid resin containing the same components may be used two or more times. The simple structure of two layers or a single layer, especially a single layer, can be obtained in the industry.

In addition, the single or the plurality of polyamic acid resin layers is laminated on a sheet-shaped support member, after the single or the plurality of polyimide resin layers is formed through imidization, the polyamic acid resin film may be further formed thereon. In this case, in order to improve the adhesion between the polyimide resin layer and the polyamic acid resin film layer, a surface treatment is preferably performed on the polyimide resin layer by using plasma. Through the surface treatment using the plasma, the surface of the polyimide resin layer may be roughened, or the chemical structure of the surface may be changed. In this way, the wettability of the surface of the polyimide resin layer is improved, the affinity with the polyamic acid solution is improved, and the coating film can be stably maintained on the surface.

In the steps for forming the coating film, the metal ions (or metal salts) may interact with the carboxyl group of the polyamic acid resin which is used as the polyimide resin precursor, and are adsorbed on the carboxyl group, or a complex is formed. Such phenomenon takes effect by homogenizing the concentration distribution of the metal ions in the coating film. Therefore, non-uniform distribution or coagulation of the metal nanoparticles precipitated in the polyimide resin is prevented, and the metal nanoparticles having uniform shapes are precipitated with uniform distribution.

[Step B: Heat Treatment Step]

In Step B, heat treatment is performed on the coating film obtained by the method at a temperature in the range of 200° C. to 450° C., and more preferably, in the range of 300° C. to 400° C., so as to reduce the metal ions (or metal salts) into metal nanoparticles, which are then precipitated. In addition, the polyamic acid resin in the coating film is imidized through the heat treatment, so as to form a polyimide resin layer, in which the content of the metal nanoparticles in the polyimide resin layer may be in the range of 1 $\mu g/cm^2$ to 30 $\mu g/cm^2$, preferably in the range of 1.5 $\mu g/cm^2$ to 25 $\mu g/cm^2$, and more preferably in the range of 2 μg/cm² to 25 μg/cm²; and the thickness of the polyimide resin layer may be in the range of 25 nm to 1 μm, preferably in the range of 25 nm to 600 nm, and more preferably in the range of 30 nm to 300 nm. If the temperature of the heat treatment is lower than 200° C., the metal ions (or metal salts) cannot be reduced into metal nanoparticles with the mean particle diameter higher than the lower limit. In another aspect, if the temperature of the heat treatment is higher than 450° C., the polyimide resin layer is decomposed due to heat, and the particle spacing between adjacent metal nanoparticles cannot be controlled. By setting the temperature of the heat treatment to be higher than 200° C., heat diffusion of the metal nanoparticles precipitated through reduction can be fully performed in the polyimide resin layer (or polyamic acid resin layer), and the polyamic acid resin can be imidized, thereby omitting the step of imidization through heating.

As described below, the heating time may be determined according to a target interparticle distance, the heating temperature, and the content of the metal ions (or metal salts) in the coating film. For example, if the heating temperature is 200° C., the heating time may be set in the range of 10 minutes to 180 minutes; if the heating temperature is 450° C., the heating time may be set in the range of 1 minute to 60 minutes.

The mean particle diameter and interparticle distance of the metal nanoparticles may be controlled by the heating temperature in the heat treatment step, the content of the metal ions (or metal salts) in the coating film, and the thickness of the finally formed polyimide resin layer. The inventors of the present invention have the following viewpoint: if the temperature of the heat treatment is fixed, and the absolute amount of the metal ions (or metal salts) in the coating film varies, or the absolute amount of the metal ions (or metal salts) in the coating film is fixed and the thickness of the coating film varies, the particle diameters of the precipitated metal nanoparticles are different. In addition, the inventors also have the following viewpoint: when the heat treatment is performed without controlling the temperature of the heat treatment, the content of the metal ions (or metal salts) in the coating film and the thickness of the finally formed polyimide resin layer, the interparticle distance may be decreased, or the metal nanoparticles are coagulated on the surface of the polyimide resin layer to form islands.

Based on the above viewpoints, the mean particle diameter and interparticle distance of the metal nanoparticles may be controlled by controlling the conditions of the heat treatment. That is, by controlling the conditions of the heat treatment, the mean particle diameter of the metal nanoparticles is controlled in the range of 20 nm to 30 nm, and the spacing (interparticle distance) L of the metal nanoparticles is controlled to be greater than and equal to a particle diameter ($D_L$) of a larger on of two adjacent metal nanoparticles, that is, $L \geq D_L$. In addition, the relationship of the larger particle diameter $D_L$ and the smaller particle diameter $D_s$ of the adjacent metal nanoparticles 3 satisfy the relationship $D_L \geq D_s$. In the metal nanoparticle composite of this embodiment meets the requirements of Step A and Step B, so that the heat diffusion of the precipitated metal nanoparticles gets easy, and the metal nanoparticles are dispersed in the polyimide resin with the interparticle distance L of greater than and equal to the particle diameter $D_L$ of a larger one of adjacent metal nanoparticles. Even if the interparticle distance L is great, no specific problem occurs. Since the interparticle distance L of the metal nanoparticles dispersed through heat diffusion is closely associated with the particle diameters D of the metal nanoparticles and the volume fraction of the metal nanoparticles, an upper limit of the interparticle distance L is preferably controlled according to a lower limit of the volume fraction of the metal nanoparticles.

Preferably, the volume fraction of the metal nanoparticles in the polyimide resin layer relative to the metal nanoparticle composite is set to be 1% to 10%. The "volume fraction" herein refers to a ratio of a total volume of the metal nanoparticles to a certain volume of the nanocomposite material in percentage. The interparticle distance L may be controlled by controlling the volume fraction of the metal nanoparticles in the foregoing range.

The production method of the present invention has industrial advantages such as being applicable in the lab scale to production scale by using simple devices without any specific limitations, and capable of dealing with single or continuous mode. In addition, Step B may be performed in an inert gas atmosphere such as Ar and $N_2$, or in vacuum or atmosphere of 1 KPa to 5 KPa. The gas-phase reduction using reducing gases such as hydrogen or photo-reduction (ultraviolet) is undesirably used as the method for precipitating metal in particles (the reduction treatment method). In gas-phase reduction, no metal nanoparticle is formed near the surface of the matrix resin layer, and the reducing gas promotes thermal decomposition of the matrix resin; and therefore, it is difficult to control the particle spacing of the metal nanoparticles. In addition, in photo-reduction, due to the transmittance of the polyimide resin layer, the metal nanoparticles near the surface and those in the deep portion may have non-uniform densities; and therefore, it is difficult to control the particle diameters D and interparticle distance L of the metal nanoparticles, and reduction efficiency is low. In addition, when the metal in particles precipitated in Step B is Ag (silver) or Ni (nickel) that can promote the deposition of the polyimide resin (or polyamic acid resin) (having the catalyst function), Step B is preferably performed in an inert gas atmosphere such as Ar and $N_2$, or in vacuum or atmosphere of 1 KPa to 5 KPa.

In Step B, the imidization of the polyamic acid resin may be conducted by using the heat in the reduction treatment, and therefore, the steps from precipitation to imidization of the metal nanoparticles may be carried out by a one-pot process, thereby simplifying the production steps.

Besides, in the reduction using heat treatment, the metal ions (or metal salts) in the coating film may be reduced, and the metal nanoparticles are independently precipitated by means of heat diffusion. The metal nanoparticles thus formed maintain an interparticle distance L greater than and equal to a certain value, and have shapes that are substantially uniform, and the metal nanoparticles are uniformly dispersed in the polyimide resin layer in a three-dimensional manner. In addition, by controlling resin structure units that form the matrix resin or controlling the absolute amount of the metal ions (or metal salts) and the volume fraction of the metal nanoparticles, the mean particle diameter of the metal nanoparticles and the distribution state of the metal nanoparticles in the polyimide resin layer may also be controlled.

In addition, the coating film is formed in a way that the content of the metal nanoparticles in the polyimide resin layer is in the range of 2 μg/cm² to 10 μg/cm², and the thickness of the polyimide resin layer is in the range of 25 nm to 150 nm, so that a plurality of metal nanoparticles are dispersed in a range from the surface S of the polyimide resin to a depth of 150 nm and in a plane direction parallel to the surface S, thereby forming a metal nanoparticle layer. Moreover, in the metal nanoparticle layer, the metal nanoparticles do not overlap with the foregoing depth direction. That is, from a section parallel to the surface S of the polyimide resin in the metal nanoparticle composite, it can be observed that a large quantity of metal nanoparticles are dispersed and distributed in (or on the surface S of) the polyimide resin with the interparticle distance L greater than and equal to the particle diameter $D_L$. From a section of the depth direction of the polyimide resin, it can be observed that a large quantity of metal nanoparticles are independently distributed in a single layer (although positions of some particles positions are not aligned, the positions are basically in a column) in the metal nanoparticle layer. A method for observing such a state may use a Scanning Electron Microscope (SEM) with a sputtering function.

In addition, in the production method of this embodiment, similar to the first embodiment, any steps such as the following etching step and patterning step may be performed.

EXAMPLES

The present invention is specifically described through the examples, but is not limited thereto. In addition, in the examples of the present invention, unless otherwise specified, various measurement and assessment are performed in the following manners.

[Measurement of the Mean Particle Diameter of the Metal Nanoparticles]

The mean particle diameter of the metal nanoparticles is measured through cutting a section of a sample into ultrathin sections by using a slicing machine (Ultra-Cut UTC ultrathin slicing machine manufactured by Leica Company) and observing by using a TEM (JEM-2000EX manufactured by JEOL Company). In addition, it is difficult to observe the sample made on the glass substrate by the foregoing method; therefore the observation is performed on the sample fabricated with the same condition on the polyimide film. Besides, the mean particle diameter of the metal nanoparticles is set to an area mean diameter.

[Measurement of the Absorption Spectrum of the Sample]

The absorption spectrum of the fabricated sample is observed by ultraviolet, visible and near-infrared spectrometry (by using U-4000 manufactured by HITACHI Company).

[Measurement of Transmittance]

The transmittance is measured by ultraviolet and visible spectroscopic analysis (by using UV-vis V-550 manufactured by JASCO Company).

[Measurement of the Coefficient of Thermal Expansion (CTE)]

The CTE is measured by using a thermo-mechanical analyzer (manufactured by Seiko Instruments Inc.). The temperature is raised to 250° C. and then maintained for 10 minutes; then cooling is performed at a rate of 5° C./minute, so as to calculate the mean CTE from 240° C. to 100° C.

[Measurement of Water Absorption Rate]

The water absorption rate is measured by drying the sample at a temperature of 80° C. for two 2 hours, and detecting a mass a of the dried sample; then, placing the dried sample at a temperature of 23° C. and a humidity of 50% 24 hours (environmental test), and detecting a mass b of the sample. The water absorption rate is calculated by using the detected mass of the sample according to the following Equation (A):

[Water absorption rate (%)={(weight $b$−weight $a$)/weight $a$}×100    (A)

Synthesis Example 1

In a 1000 ml separable flask, 425 g of DMAc, 31.8 g of 2,2'-dimethyl-4,4'-diaminodiphenyl (m-TB) and 4.9 g of APB were stirred for 30 minutes at room temperature. Then, 28.6 g of PMDA and 9.6 g of BPDA were added, and stirred continuously for 3 hours at room temperature in a nitrogen atmosphere for polymerization, so as to obtain a sticky polyamic acid resin solution $S_1$. The viscosity of the obtained polyamic acid solution $S_1$ was measured to be 28,000 poise (25° C.) by using an E-type viscometer (DV-II+Pro CP model manufactured by Brookfield Company).

The obtained polyamic acid resin solution $S_1$ was coated on the stainless steel substrate, and dried for 5 minutes at 130° C. The temperature was raised to 360° C. within 15 minutes to complete imidization, so as to obtain a polyimide film laminated on the stainless steel substrate. The polyimide film was stripped from the stainless steel substrate, to obtain a polyimide film $P_1$ with a thickness of 25 μm. The CTE of the film was $21 \times 10^{-6}$/K. The transmittance of the film at 400 nm, 500 nm and 600 nm was respectively 0%, 70.5% and 82%. The water absorption rate of the film was 0.89%.

Synthesis Example 2

In a 500 ml separable flask, 15.24 g, 47.6 mmol of TFMB was dissolved in 170 g of DMAc with stirring. Next, 14.76 g, 47.6 mmol of 4,4'-Oxydiphtalic Anhydride (ODPA) was added to the solution under a nitrogen flow, and the solution was continuously stirred for 4 hours at room temperature for polymerization, to obtain a colorless sticky polyamic acid resin solution $S_2$. The viscosity of the obtained polyamic acid solution $S_2$ was measured to be 3251 cP (25° C.) by using an E-type viscosimeter (DV-II+Pro CP model manufactured by Brookfield Company). The weight average molecular weight (Mw) was measured to be 163,900 by using a Gel Permeation Chromatograph (GPC) (HLC-8220GPC manufactured by Tosoh Co., Ltd.).

The obtained polyamic acid resin solution $S_2$ was coated on a stainless steel substrate, and dried for 3 minutes at 125° C. Then, stage heat treatment was performed at 160° C. for 2 minutes, at 190° C. for 30 minutes, at 200° C. for 30 minutes, at 220° C. for 3 minutes, at 280° C. for 1 minute, at 320° C. for 1 minute and at 360° C. for 1 minute respectively, to complete imidization, so as to obtain a polyimide film laminated on the stainless steel substrate. The polyimide film was stripped from the stainless steel substrate, to obtain a polyimide film $P_2$ with a thickness of 10 μm. The transmittance of the film under 400 nm was 95%, and the mean transmittance of visible light was 96%. The water absorption rate of the film was 0.35%.

Fabrication Example 1

An alkali-free glass (AN-100 manufactured by Asahi Glass Co., Ltd) test piece with a size of 10 cm×10 cm (with a thickness of 0.7 mm) was processed for 5 minutes by using a 5 N sodium hydroxide aqueous solution at 50° C. Then, the glass substrate of the test piece was washed with pure water and dried, and then immersed in a 1 wt % 3-aminopropyltriethoxysilane (referred to as "γ-APS") aqueous solution. The glass substrate was taken out from the γ-APS aqueous solution and dried, and heated for 5 minutes at 150° C., to fabricate a glass substrate G1.

Fabrication Example 2

An alkali-free glass (AN-100 manufactured by Asahi Glass Co., Ltd) test piece with a size of 10 cm×10 cm (with a thickness of 0.7 mm) was processed for 5 minutes by using a 5 N of sodium hydroxide aqueous solution at 50° C. Then, the glass substrate of the test piece was washed with pure water and dried, was and then immersed in a 1 wt % γ-APS aqueous solution. The glass substrate was taken out from the γ-APS aqueous solution and dried, and heated for 5 minutes at 110° C., to fabricate a glass substrate G2.

Example 1

0.242 g of chloroauric acid tetrahydrate dissolved in 7.33 g of DMAc was added to 2.67 g of the polyamic acid resin solution $S_1$ (the concentration of the solid components was 15 wt %) obtained in Synthesis Example 2, and the solution was stirred for 15 minutes at room temperature in a nitrogen atmosphere, to prepare the polyamic acid resin solution containing a gold complex. The obtained polyamic acid resin solution containing a gold complex was coated on the glass substrate G1 obtained in Fabrication Example 1 by using a spin coater (SPINCOATER 1H-DX2 manufactured by Mikasa Co., Ltd.), and then dried for 3 minutes at 70° C. and for 20 minutes at 130° C., to form a polyamic acid resin film containing a gold complex with a thickness of 335 nm on the glass substrate G1. The polyamic acid resin film containing a gold complex was subjected to heat treatment for 10 minutes at 200° C. in atmosphere, to fabricate a nanocomposite material film 1 (with a thickness of 200 nm) dispersed with metal gold nanoparticles. The metal gold nanoparticles formed in the nanocomposite material film 1 were completely independent in a region in a thickness direction from a surface portion of the film, and were dispersed with a spacing between adjacent metal gold nanoparticles of greater than and equal to a particle diameter of a larger one of the adjacent metal gold nanoparticles. In addition, the metal gold nanoparticles also exist in the range of 0 nm to 50 nm from a plane of a surface side of the film. In addition, the metal gold nanoparticles formed in the film have the following characteristics:

Shape: basically spherical shape; mean particle diameter: about 9.8 nm; minimum particle diameter: about 3.0 nm; maximum particle diameter: about 19.0 nm; volume fraction relative to the nanocomposite material film 1: 1.9%; and mean interparticle distance: about 19.6 nm.

In addition, in the LSPR absorption spectrum generated by the metal gold nanoparticles in the nanocomposite material film 1, an absorption peak with a crest of 556 nm and a half-value width at 99 nm was observed.

Example 2

Instead of subjecting the polyamic acid resin film containing a gold complex to heat treatment for 10 minutes at 200° C. in atmosphere as described in Example 1, the polyamic acid resin film containing a gold complex was subjected to heat treatment for 10 minutes at 300° C. in atmosphere. Besides, a nanocomposite material film 2 (with a thickness of 200 nm) dispersed with metal gold nanoparticles was fabricated in the same manner as that in Example 1. The metal gold nanoparticles formed in the nanocomposite material film 2 were completely independent in a region in a thickness direction from a surface portion of the film, and were dispersed with a spacing between adjacent metal gold nanoparticles of greater than and equal to a particle diameter of a larger one of the adjacent metal gold nanoparticles. In addition, the metal gold nanoparticles also exist in the range of 0 nm to 50 nm from a plane of a surface side of the film. In addition, the metal gold nanoparticles formed in the film had the following characteristics:

Shape: basically spherical shape; mean particle diameter: about 13.2 nm; minimum particle diameter: about 4.0 nm; maximum particle diameter: about 19.0 nm; volume fraction relative to the nanocomposite material film 2: 1.9%; and mean interparticle distance: about 26.5 nm.

Example 3

Instead of subjecting the polyamic acid resin film containing a gold complex to heat treatment for 10 minutes at 200° C. in atmosphere as described in Example 1, the polyamic acid resin film containing a gold complex was subjected to heat treatment for 60 minutes at 300° C. in atmosphere. Besides, a nanocomposite material film 3 (with a thickness of 200 nm) dispersed with metal gold nanoparticles was fabricated in the same manner as that in Example 1. The metal gold nanoparticles formed in the nanocomposite material film 3 were completely independent in a region in a thickness direction from a surface portion of the film, and were dispersed with a spacing between adjacent metal gold nanoparticles of greater than and equal to a particle diameter of a larger one of the adjacent metal gold nanoparticles. In addition, the metal gold nanoparticles also exist in the range of 0 nm to 50 nm from a plane of a surface side of the film. In addition, the metal gold nanoparticles formed in the film had the following characteristics:

Shape: basically spherical shape; mean particle diameter: about 13.9 nm; minimum particle diameter: about 4.0 nm; maximum particle diameter: about 20.0 nm; volume fraction relative to the nanocomposite material film 3: 1.9%; and mean interparticle distance: about 27.9 nm.

Example 4

0.174 g of chloroauric acid tetrahydrate dissolved in 17.33 g of DMAc was added to 2.67 g of the polyamic acid resin solution $S_2$ obtained in Synthesis Example 2, and the solution was stirred for 15 minutes at room temperature in a nitrogen atmosphere, to prepare the polyamic acid resin solution containing a gold complex. The obtained polyamic acid resin solution containing a gold complex was coated on the glass substrate G1 obtained in Fabrication Example 1 by using a spin coater (SPINCOATER 1H-DX2 manufactured by Mikasa Co., Ltd.), and then dried for 3 minutes at 70° C. and for 20 minutes at 130° C., to form a polyamic acid resin film containing a gold complex with a thickness of 50 nm on the glass substrate G1. The polyamic acid resin film containing a gold complex was subjected to heat treatment for 10 minutes at 300° C. in atmosphere, to fabricate a red nanocomposite material film 4 (with a thickness of 30 nm) dispersed with metal gold nanoparticles. The metal gold nanoparticles formed in the nanocomposite material film 4 were completely independent in a region in a thickness direction from a surface portion of the film, and were dispersed with a spacing between adjacent metal gold nanoparticles of greater than and equal to a particle diameter of a larger one of the adjacent metal gold nanoparticles. In addition, the metal gold nanoparticles also exist in the range of 0 nm to 50 nm from a plane of a surface side of the film. In addition, the metal gold nanoparticles formed in the film had the following characteristics:

Shape: basically spherical shape; mean particle diameter: about 4.2 nm; minimum particle diameter: about 3.0 nm; maximum particle diameter: about 9.8 nm; volume fraction relative to the nanocomposite material film 4: 1.35%; and mean interparticle distance: about 17.4 nm.

In addition, in the LSPR absorption spectrum generated by the metal gold nanoparticles in the nanocomposite material film 4, an absorption peak with a crest of 544 nm and a half-value width at 78 nm was observed.

Example 5

A red nanocomposite material film 5 (with a thickness of 30 nm) dispersed with metal gold nanoparticles was fabricated in the same manner as that in Example 4.

A region from a plane of a surface side of the nanocomposite material film 5 to the thickness of 7 nm was removed through plasma etching by using a vacuum plasma device (plasma cleaner VE-1500II manufactured by Mory Engineering Co. Ltd.), to obtain a nanocomposite material film 5'. It was confirmed that a part of the metal gold nanoparticles were exposed from the plane of the surface side of the film. At this time, the volume fraction of the metal gold nanoparticles in the nanocomposite material film 5' was 1.08%. In addition, in the LSPR absorption spectrum generated by the metal gold nanoparticles in the nanocomposite material film 5', an absorption peak with a peak of 525 nm and a half-value width at 68 nm was observed.

Example 6

0.174 g of chloroauric acid tetrahydrate dissolved in 5.33 g of DMAc was added to 2.67 g of the polyamic acid resin solution $S_2$ obtained in Synthesis Example 2, and the solution was stirred for 15 minutes at room temperature in a nitrogen atmosphere, to prepare the polyamic acid resin solution containing a gold complex. The obtained polyamic acid resin solution containing a gold complex was coated on the glass substrate G1 obtained in Fabrication Example 1 by using a spin coater (SPINCOATER 1H-DX2 manufactured by Mikasa Co., Ltd.), and then dried for 3 minutes at 70° C. and for 20 minutes at 130° C., to form a polyamic acid resin film containing a gold complex with a thickness of 330 nm on the glass substrate G1. The polyamic acid resin film containing a gold complex was subjected to heat treatment for 10 minutes at 300° C. in atmosphere, so as to fabricate a red nanocomposite material film 6 (with a thickness of 200 nm) dispersed with metal gold nanoparticles. The metal gold nanoparticles formed in the nanocomposite material film 6 were completely independent in a region in a thickness direction from a surface portion of the film, and were dispersed with a spacing between adjacent metal gold nanoparticles of greater than and equal to a particle diameter of a larger one of the adjacent metal gold nanoparticles. In addition, the metal gold nanoparticles also exist in the range of 0 nm to 50 nm from a plane of a surface side of the film. In addition, the metal gold nanoparticles formed in the film had the following characteristics:

Shape: basically spherical shape; mean particle diameter: about 16.5 nm; minimum particle diameter: about 11.2 nm; maximum particle diameter: about 23.1 nm; volume fraction relative to the nanocomposite material film 6: 1.35%; and mean interparticle distance: about 39.4 nm.

In addition, in the LSPR absorption spectrum generated by the metal gold nanoparticles in the nanocomposite material film 6, an absorption peak with a crest at 562 nm and a half-value width at 76 nm was observed.

Example 7

0.174 g of chloroauric acid tetrahydrate dissolved in 2.66 g of DMAc was added to 2.67 g of the polyamic acid resin solution $S_2$ obtained in Synthesis Example 2, and the solution was stirred for 15 minutes at room temperature in a nitrogen atmosphere, to prepare the polyamic acid resin solution containing a gold complex. The obtained polyamic acid resin solution containing a gold complex was coated on the glass substrate G1 obtained in Fabrication Example 1 by using a spin coater (SPINCOATER 1H-DX2 manufactured by Mikasa Co., Ltd.), and then dried for 3 minutes at 70° C. and for 20 minutes at 130° C., to form a polyamic acid resin film containing a gold complex with a thickness of 1 μm on the glass substrate G1. The polyamic acid resin film containing a gold complex was subjected to heat treatment for 10 minutes at 300° C. in atmosphere, so as to fabricate a red nanocomposite material film 7 (with a thickness of 600 nm) dispersed with metal gold nanoparticles. The metal gold nanoparticles formed in the nanocomposite material film 7 were completely independent in a region in a thickness direction from a surface portion of the film, and were dispersed with a spacing between adjacent metal gold nanoparticles of greater than and equal to a particle diameter of a larger one of the adjacent metal gold nanoparticles. In addition, the metal gold nanoparticles also exist in the range of 0 nm to 50 nm from a plane of a surface side of the film. In addition, the metal gold nanoparticles formed in the film had the following characteristics:

1) In a region from a plane of a surface side of the nanocomposite material film 7 to a thickness of 100 nm:

Shape: basically spherical shape; mean particle diameter: about 20.2 nm; minimum particle diameter: about 10.3 nm; maximum particle diameter: about 44.9 nm; and mean interparticle distance: about 20.4 nm;

2) In a region of a thickness range from 100 nm to 600 nm from a plane of a surface side of the nanocomposite material film 7:

Shape: octahedron; mean particle diameter: about 65.1 nm; minimum particle diameter: about 24.8 nm; maximum particle diameter: about 105.6 nm; and mean interparticle distance: about 100.2 nm; and 3) volume fraction relative to the nanocomposite material film 7: 13.5%.

In addition, in the LSPR absorption spectrum generated by the metal gold nanoparticles in the nanocomposite material film 7, a crest was observed in a range from 620 nm to 688 nm, and the peak was hump-shaped. In addition, the half-value width was at 189 nm.

Example 8

A violet nanocomposite material film 8 (with a thickness of 600 nm) dispersed with metal gold nanoparticles was fabricated in the same manner as that in Example 7.

A region from a plane of a surface side of the nanocomposite material film 8 to the thickness of 100 nm was removed through plasma etching by using a vacuum plasma device (plasma cleaner VE-1500II manufactured by Mory Engineering Co. Ltd.), to obtain a nanocomposite material film 8'. It was confirmed that a part of the metal gold nanoparticles were exposed from the plane of the surface side of the film. The metal gold nanoparticles formed in the film had the following characteristics:

Shape: octahedron; mean particle diameter: about 65.1 nm; minimum particle diameter: about 24.8 nm; maximum particle diameter: about 105.6 nm; and mean interparticle distance: about 100.2 nm.

Example 9

The polyamic acid resin solution obtained in Synthesis Example 2 was coated on the glass substrate G1 obtained in Fabrication Example 1 by using a spin coater (SPINCOATER 1H-DX2 manufactured by Mikasa Co., Ltd.), and then dried for 3 minutes at 70° C. and for 20 minutes at 130° C., to form a polyamic acid resin film with a thickness of 320 nm on the glass substrate G1. The resin film was immersed in a 100 mM silver nitrate aqueous solution (25° C.) for 60 minutes, and was washed with distilled water and dried, to form a polyamic acid resin film containing silver (I) ions. The polyamic acid resin film containing silver (I) ions was subjected to heat treatment for 10 minutes at 200° C. in atmosphere, so as to fabricate a yellow nanocomposite material polyimide 9 (with a thickness of 200 nm) dispersed with metal silver nanoparticles. The metal silver nanoparticles formed in the nanocomposite material film 9 were completely independent in a region in a thickness direction from a surface portion of the film, and were dispersed with a spacing between adjacent metal silver nanoparticles of greater than and equal to a particle diameter of a larger one of the adjacent metal silver nanoparticles. In addition, the metal silver nanoparticles also exist in a range from a plane of a surface side of the film to the thickness of 50 nm. In addition, the metal silver nanoparticles formed in the film had the following characteristics:

Shape: spherical shape; mean particle diameter: about 4.8 nm; minimum particle diameter: about 3.3 nm; maximum particle diameter: about 5.0 nm; volume fraction relative to the nanocomposite material film 9: 3.99%; and mean inter-particle distance: about 5.0 nm.

In addition, in the LSPR absorption spectrum generated by the metal silver nanoparticles in the nanocomposite material film 9, an absorption peak with a crest at 442 nm and a half-value width at 61 nm was observed.

Example 10

A polyimide film (Kapton EN manufactured by Du Pont-Toray Co., Ltd., with a thickness of 25 μm, the transmittance of 0%, 37.7%, and 71.7% respectively at 400 nm, 500 nm and 600 nm, and a water absorption rate of 1.7%) was immersed in a 5 N potassium hydroxide aqueous solution for 85 seconds at 50° C., so as to form a modification layer with a thickness of 200 nm on a surface of the film. The film was immersed in a 100 mM silver nitrate aqueous solution (25° C.) for 60 minutes, and was washed with distilled water and dried, to form a polyamic acid resin layer containing silver (I) ions. The polyamic acid resin layer containing silver (I) ions was subjected to heat treatment for 10 minutes at 200° C. in atmosphere, so as to fabricate a nanocomposite material polyimide 10 (the thickness of the nanocomposite material layer dispersed with metal silver nanoparticles was about 120 nm). The metal silver nanoparticles formed in the nanocomposite material film 10 were completely independent in a region in a thickness direction from a surface portion of the film, and were dispersed with a spacing between adjacent metal silver nanoparticles of greater than and equal to a particle diameter of a larger one of the adjacent metal gold nanoparticles. In addition, the metal silver nanoparticles also exist in a range from a plane of a surface side of the film to the thickness of 50 nm. In addition, the metal silver nanoparticles formed in the film had the following characteristics:

Shape: spherical shape; mean particle diameter: about 4.1 nm; minimum particle diameter: about 2.0 nm; maximum particle diameter: about 5.9 nm; volume fraction relative to the nanocomposite material film 10: 5.96%; and mean inter-particle distance: about 4.4 nm.

In addition, in the LSPR absorption spectrum generated by the metal silver nanoparticles in the nanocomposite material film 10, an absorption peak with a crest at 446 nm and a half-value width at 64 nm was observed.

Example 11

Instead of subjecting the polyamic acid resin layer containing silver (I) ions to heat treatment for 10 minutes at 200° C. in atmosphere as described in Example 10, the polyamic acid resin layer containing silver (I) ions was subjected to heat treatment for 20 minutes at 200° C. in atmosphere. Besides, a nanocomposite material polyimide film 11 dispersed with metal silver nanoparticles (the thickness of the nanocomposite material layer dispersed with metal silver nanoparticles was about 120 nm) was fabricated in the same manner as that in Example 10. The metal silver nanoparticles formed in the nanocomposite material film 11 were completely independent in a region in a thickness direction from a surface portion of the film, and were dispersed with a spacing between adjacent metal silver nanoparticles of greater than and equal to a particle diameter of a larger one of the adjacent metal gold nanoparticles. In addition, the metal silver nanoparticles also exist in a range from a plane of a surface side of the film to the thickness of 50 nm. In addition, the metal silver nanoparticles formed in the film had the following characteristics:

Shape: spherical shape; mean particle diameter: about 5.3 nm; minimum particle diameter: about 3.2 nm; maximum particle diameter: about 7.0 nm; volume fraction relative to the nanocomposite material film 11: 5.96%; and mean inter-particle distance: about 5.7 nm.

In addition, in the LSPR absorption spectrum generated by the metal silver nanoparticles in the nanocomposite material film 11, an absorption peak with a crest at 446 nm and a half-value width at 69 nm was observed.

Example 12

Instead of subjecting the polyamic acid resin layer containing silver (I) ions to heat treatment for 10 minutes at 200° C. in atmosphere as described in Example 10, the polyamic acid resin layer containing silver (I) ions was subjected to heat treatment for 10 minutes at 300° C. in atmosphere. Besides, a nanocomposite material polyimide film 12 dispersed with metal silver nanoparticles (the thickness of the nanocomposite material layer dispersed with metal silver nanoparticles was about 120 nm) was fabricated in the same manner as that in Example 10. The metal silver nanoparticles formed in the nanocomposite material film 12 were completely independent in a region in a thickness direction from a surface portion of the film, and were dispersed with a spacing between adjacent metal silver nanoparticles of greater than and equal to a particle diameter of a larger one of the adjacent metal gold nanoparticles. In addition, the metal silver nanoparticles also exist in a range from a plane of a surface side of the film to the thickness of 50 nm. In addition, the metal silver nanoparticles formed in the film had the following characteristics:

Shape: spherical shape; mean particle diameter: about 7.2 nm; minimum particle diameter: about 5.0 nm; maximum particle diameter: about 9.9 nm; volume fraction relative to the nanocomposite material film 12: 5.96%; and mean inter-particle distance: about 7.7 nm.

In addition, in the LSPR absorption spectrum generated by the metal silver nanoparticles in the nanocomposite material film 12, an absorption peak with a crest at 454 nm and a half-value width at 80 nm was observed.

Example 13

A nanocomposite material polyimide film 13 dispersed with metal silver nanoparticles (the thickness of the nanocomposite material layer dispersed with metal silver nanoparticles was 120 nm) was fabricated in the same manner as that in Example 10.

A region from a plane of a surface side of the nanocomposite material film 13 to the thickness of 7 nm was removed through plasma etching by using a vacuum plasma device (plasma cleaner VE-1500II manufactured by Mory Engineering Co. Ltd.), to obtain a nanocomposite material film 13'. It was confirmed that a part of the metal silver nanoparticles were exposed from the plane of the surface side of the film.

In addition, in the LSPR absorption spectrum generated by the metal silver nanoparticles in the nanocomposite material film 13', an absorption peak with a crest at 444 nm and a half-value width at 65 nm was observed.

Comparison Example 1

A polyamic acid resin layer containing silver (I) ions was formed in the same manner as that in Example 10. Next, the polyamic acid resin layer containing silver (I) ions was radiated (for 5 minutes at the intensity of 270 mW/cm$^2$) with ultraviolet rays by using a mercury xenon lamp, so as to fabricate a nanocomposite material polyimide film dispersed with metal silver nanoparticles. The metal silver nanoparticles formed in the film were concentrated near a surface of the film, and the density of the metal silver nanoparticles decreased along with the increase of the depth. In addition, the metal silver nanoparticles formed in the film had the following characteristics:

1) Mean particle diameter of the metal nanoparticles at a surface portion of the nanocomposite material film: about 10.1 nm; mean interparticle distance: about 8.6 nm.

2) Mean particle diameter of the metal nanoparticles near the depth of 100 nm from a plane of a surface side of the nanocomposite material film: about 8.0 nm; mean interparticle distance: 15.4 nm.

In addition, in the LSPR absorption spectrum generated by the metal silver nanoparticles in the film, an absorption peak with a crest at 440 nm and a half-value width at 156 nm was observed.

Comparison Example 2

Instead of subjecting the polyamic acid resin layer containing silver (I) ions to heat treatment for 10 minutes at 200° C. in atmosphere as described in Example 10, the polyamic acid resin layer containing silver (I) ions was subjected to heat treatment for 60 minutes at 300° C. in atmosphere. Besides, a nanocomposite material polyimide film dispersed with metal silver nanoparticles (a thickness of the nanocomposite material layer was about 120 nm) was fabricated in the same manner as that in Example 10. The metal silver nanoparticles formed in the nanocomposite material film were completely independent in a region in a thickness direction from a surface portion of the film, and it was confirmed that the metal silver nanoparticles that were dispersed with a spacing between adjacent metal silver nanoparticles of smaller than a particle diameter of a larger one of the adjacent metal gold nanoparticles. In addition, the metal silver nanoparticles formed in the film had the following characteristics:

Shape: spherical shape; mean particle diameter: about 18.5 nm; minimum particle diameter: about 9.0 nm; maximum particle diameter: about 25.0 nm; and interparticle distance: about 14.9 nm.

In addition, in the LSPR absorption spectrum generated by the metal silver nanoparticles in the film, an absorption peak with a crest at 536 nm and a half-value width at 182 nm was observed.

As described above, in the nanocomposite material film having structures a to d according to the examples, the LSPR absorption spectrum generated by the metal gold nanoparticles is sharp, and when the LSPR is used in various sensing devices, highly precise detection can be performed. In comparison, in the nanocomposite material film according to the comparison examples, the LSPR absorption spectrum generated by the metal gold nanoparticles is wider than those in the examples, and it is generally considered that such LSPR absorption spectrum is not suitable for being used in high-sensitive sensing devices.

Example 14

0.726 g of chloroauric acid tetrahydrate dissolved in 5.33 g of DMAc was added to 2.67 g of the polyamic acid resin solution $S_1$ obtained in Synthesis Example 1, and the solution was stirred for 15 minutes at room temperature in a nitrogen atmosphere, to prepare the polyamic acid resin solution containing a gold complex. The obtained polyamic acid resin solution containing a gold complex was coated on the glass substrate G2 obtained in Fabrication Example 2 by using a spin coater (SPINCOATER 1H-DX2 manufactured by Mikasa Co., Ltd.), and then dried for 3 minutes at 70° C. and for 10 minutes at 130° C., to form a polyamic acid resin film 14 containing a gold complex with a thickness of 333 nm on the glass substrate G2. In the polyamic acid resin film 14 containing a gold complex, the content of the gold per unit area was 21.4 μg/cm$^2$. The polyamic acid resin film 14 containing a gold complex was subjected to heat treatment for 10 minutes at 400° C. in atmosphere, so as to fabricate a red nanocomposite material film 14 (with a thickness of 200 nm) dispersed with metal gold nanoparticles. The metal gold nanoparticles formed in the nanocomposite material film 14 were completely independent, and were dispersed with a spacing between adjacent metal gold nanoparticles of greater than and equal to a particle diameter of a larger one of the adjacent metal gold nanoparticles. In addition, the metal gold nanoparticles formed in the film had the following characteristics:

Shape: a mixture of polyhedral particles and spherical particles; mean particle diameter: 24.5 nm; maximum particle diameter: 54.0 nm; minimum particle diameter: 5.0 nm; volume fraction of gold in the nanocomposite material film 14: 5.54%; and mean interparticle distance: 27.3 nm.

In addition, in the LSPR absorption spectrum generated by the metal gold nanoparticles in the nanocomposite material film 14, an absorption peak with a crest at 578 nm and a half-value width at 107 nm was observed.

Example 15

0.522 g of chloroauric acid tetrahydrate dissolved in 17.33 g of DMAc was added to 2.67 g of the polyamic acid resin solution $S_2$ obtained in Synthesis Example 2, and the solution was stirred for 15 minutes at room temperature in a nitrogen atmosphere, to prepare the polyamic acid resin solution containing a gold complex. The obtained polyamic acid resin solution containing a gold complex was coated on the glass substrate G2 obtained in Fabrication Example 2 by using a spin coater (SPINCOATER 1H-DX2 manufactured by Mikasa Co., Ltd.), and then dried for 3 minutes at 70° C. and for 10 minutes at 130° C., to form a polyamic acid resin film 15 containing a gold complex with a thickness of 40 nm on the glass substrate G2. In the polyamic acid resin film 15 containing a gold complex, the content of the gold per unit area was 2.29 μg/cm$^2$. The polyamic acid resin film 15 containing a gold complex was subjected to heat treatment for 10 minutes at 400° C. in atmosphere, so as to fabricate a red nanocomposite material film 15 (with a thickness of 30.3 nm) dispersed with metal gold nanoparticles. The metal gold nanoparticles formed in the nanocomposite material film 15 were completely independent, and were dispersed with a spacing between adjacent metal gold nanoparticles of greater than and equal to a particle diameter of a larger one of the adjacent metal gold nanoparticles. In addition, the metal gold nanoparticles formed in the film had the following characteristics:

Shape: polyhedron; mean particle diameter: 20.9 nm; maximum particle diameter: 29.0 nm; minimum particle diameter: 10.0 nm; volume fraction of gold in the nanocomposite material film 15: 3.96%; and mean interparticle distance: 28.5 nm.

In addition, in the LSPR absorption spectrum generated by the metal gold nanoparticles in the nanocomposite material film 15, an absorption peak with a crest at 568 nm and a half-value width at 106 nm was observed.

Comparison Example 3

0.726 g of chloroauric acid tetrahydrate dissolved in 5.33 g of DMAc was added to 2.67 g of the polyamic acid resin solution $S_1$ obtained in Synthesis Example 1, and the solution was stirred for 15 minutes at room temperature in a nitrogen atmosphere, to prepare the polyamic acid resin solution containing a gold complex. The obtained polyamic acid resin solution containing a gold complex was coated on the glass substrate G2 obtained in Fabrication Example 2 by using a spin coater (SPINCOATER 1H-DX2 manufactured by Mikasa Co., Ltd.), and then dried for 3 minutes at 70° C. and for 10 minutes at 130° C., to form a polyamic acid resin film containing a gold complex with a thickness of 670 nm on the glass substrate G2. In the polyamic acid resin film containing a gold complex, the content of the gold per unit area was 42.8 $\mu g/cm^2$. The polyamic acid resin film of gold complex was subjected to heat treatment for 10 minutes at 400° C. in atmosphere, so as to fabricate a violet nanocomposite material film (with a thickness of 400 nm) dispersed with metal gold nanoparticles. It was confirmed that a part of metal gold nanoparticles formed in the nanocomposite material film were coagulated. In addition, the metal gold nanoparticles formed in the film had the following characteristics:

Shape: a mixture of polyhedral particles and spherical particles; mean particle diameter: 33.9 nm; maximum particle diameter: 70.2 nm; minimum particle diameter: 7.0 nm; volume fraction of gold in the nanocomposite material film: 5.54%; and mean interparticle distance: 37.8 nm.

In addition, in the LSPR absorption spectrum generated by the metal gold nanoparticles in the nanocomposite material film, an absorption peak with a crest at 594 nm and a half-value width at 172 nm was observed.

Comparison Example 4

0.174 g of chloroauric acid tetrahydrate dissolved in 2.67 g of DMAc was added to 2.67 g of the polyamic acid resin solution $S_1$ obtained in Synthesis Example 1, and the solution was stirred for 15 minutes at room temperature in a nitrogen atmosphere, to prepare the polyamic acid resin solution containing a gold complex. The obtained polyamic acid resin solution containing gold complex was coated on the glass substrate G2 obtained in Fabrication Example 2 by using a spin coater (SPINCOATER 1H-DX2 manufactured by Mikasa Co., Ltd.), and then dried for 3 minutes at 70° C. and for 10 minutes at 130° C., to form a polyamic acid resin film containing a gold complex with a thickness of about 2 $\mu m$. In the polyamic acid resin film containing a gold complex, the content of the gold per unit area was 32.12 $\mu g/cm^2$. The polyamic acid resin film of gold complex was subjected to heat treatment for 10 minutes at 400° C. in atmosphere, so as to fabricate a purple nanocomposite material film (with a thickness of 1.2 $\mu m$) dispersed with metal gold nanoparticles. In addition, the metal gold nanoparticles formed in the film had the following characteristics:

Shape: a mixture of polyhedral particles and spherical particles; mean particle diameter: 69.0 nm; maximum particle diameter: 120.3 nm; minimum particle diameter: 8.0 nm; and volume fraction of gold in the nanocomposite material film: 1.35%. The metal gold nanoparticles with a mean particle diameter of about 30 nm exist in a region from a plane of a surface side of the nanocomposite material film to the thickness of 150 nm; the metal gold nanoparticles with the mean particle diameter of about 90 nm exist in a region of a thickness range from 150 nm to 1.2 $\mu m$ from the plane of the surface side of the nanocomposite material film.

In addition, in the LSPR absorption spectrum generated by the metal gold nanoparticles in the nanocomposite material film, an absorption peak with a crest at 689 nm and a half-value width at 190 nm was observed.

Example 16

A nanocomposite material film 16 (with a thickness of 30 nm) dispersed with metal gold nanoparticles was fabricated in the same manner as that in Example 4.

Then, after hexamethyldisilazane was coated on a surface of the nanocomposite material film 16 through 60-second spin coating at a speed of 3000 rpm, positive liquid resist (OFPR-800LB manufactured by Tokyo Ohka Kogyo Co., Ltd.) was coated through 16-second spin coating at a speed of 2600 rpm, and was dried for 90 seconds at 90° C., to form a resist film. A mask with a line pattern of at least 10 $\mu m$ was arranged on the resist film, and a resist pattern of 20 $\mu m$ {width/spacing (L/S)=10 $\mu m$/10 $\mu m$} was formed by using exposure and a developer (product name: NMD-3, manufactured by Tokyo Ohka Kogyo Co., Ltd.), to obtain a glass substrate 16a having a resist pattern.

The nanocomposite material film 16 in a region not shielded by the resist layer was removed from the glass substrate 16a through oxygen plasma treatment, and the residue was removed by using an etching solution (product name: AURUM-302, manufactured by Kanto Chemical Co., Ltd.). Then, the resist film was fully exposed, and was dissolved by using a developer, so as to form a glass substrate 16b with fine patterns of a nanocomposite material dispersed with metal gold nanoparticles. The fine pattern in the obtained glass substrate 16b was assessed through observation by using a microscope (a laser microscope, product name: VK-8500, manufactured by Keyence Corporation), to confirm that a line pattern of at least 10 $\mu m$ was formed.

Example 17

Instead of using the glass substrate G1 in Fabrication Example 1 as described in Example 16, a silicon wafer was used as a substrate. Besides, a Si substrate 17b with a fine pattern of the nanocomposite material dispersed with the metal gold nanoparticles was obtained in the same manner as that in Example 16. The fine pattern in the obtained Si substrate 17b was assessed through observation by using a microscope, to confirm that a line pattern of at least 10 µm was formed.

The embodiments of the present invention are described in detail for illustration, but the present invention is not limited thereto, and various modifications can be made. The present international application claims priority to Japanese Patent Application No. 2010-44108 filed on Mar. 1, 2010 and Japanese Patent Application No. 2010-83118 filed on Mar. 31, 2010, which are incorporated herein by reference in their entireties.

LIST OF REFERENCE NUMERALS

1: Matrix resin layer, 3: Metal nanoparticles, 10: Nanocomposite material

What is claimed is:

1. A metal nanoparticle composite, comprising:
a matrix resin layer and metal nanoparticles immobilized on the matrix resin layer, the metal nanoparticles are formed by metals selected from the group consist of gold (Au), silver (Ag), copper (Cu), palladium (Pd), platinum (Pt), tin (Sn), rhodium (Rh), and iridium (Ir) and the metal nanoparticle composite comprising following structures a to e:
a) the metal nanoparticles obtained through heat-reducing metal ions or metal salts contained in the matrix resin layer or a precursor resin layer thereof;
b) the metal nanoparticles being present within a range from a surface of the matrix resin layer to a depth of at least 50 nm;
c) particle diameters (D) of the metal nanoparticles in a range of 1 nm to 100 nm with a mean particle diameter of greater than and equal to 3 nm; and
d) a spacing between adjacent metal nanoparticles is greater than and equal to the particle diameter of a larger one of the adjacent metal nanoparticles;
e) the metal nanoparticles interact with light of a wavelength greater than and equal to 380 nm, for generating a local surface plasmon resonance.

2. The metal nanoparticle composite according to claim 1, wherein a volume fraction of the metal nanoparticles relative to the metal nanoparticle composite is in a range of 0.05% to 23%.

3. The metal nanoparticle composite according to claim 1, wherein the matrix resin layer further comprises a polyimide resin.

4. The metal nanoparticle composite according to claim 3, wherein the polyimide resin is transparent or colorless.

5. The metal nanoparticle composite according to claim 3, wherein the matrix resin layer is obtained by coating a polyamic acid resin solution on a substrate and drying to form a polyamic acid resin film, and imidizing the polyamic acid resin film.

6. The metal nanoparticle composite according to claim 5, wherein the polyamic acid resin solution contains a metal compound to be used as a raw material of the metal nanoparticles.

7. The metal nanoparticle composite according to claim 6, wherein the particle diameters of the metal nanoparticles are in a range of 30 nm to 100 nm.

8. The metal nanoparticle composite according to claim 5, wherein the polyamic acid resin film is impregnated with a solution containing the metal ions or a metal compound to be used as a raw material of the metal nanoparticles, and is imidized to form the metal nanoparticle composite.

9. The metal nanoparticle composite according to claim 3, wherein the matrix resin layer is obtained by performing alkali modification on a surface of a polyimide film to form a polyamic acid resin layer, and imidizing the polyamic acid resin layer.

10. The metal nanoparticle composite according to claim 9, wherein the polyamic acid resin layer is impregnated with a solution containing the metal ions or a metal compound to be used as a raw material of the metal nanoparticles, and is imidized to form the metal nanoparticle composite.

11. The metal nanoparticle composite according to claim 1 where, a specified pattern is formed on a substrate to form the metal nanoparticle composite.

12. A production method of a metal nanoparticle composite, wherein metal nanoparticles interacting with light of a wavelength greater than and equal to 380 nm for generating a local surface plasmon resonance, and metal nanoparticles with a mean particle diameter in a polyimide resin in a range of 20 nm to 30 nm do not contact with each other, and are independently dispersed in the metal nanoparticle composite, the metal nanoparticles are formed by metals selected from the group consist of gold (Au), silver (Ag), copper (Cu), palladium (Pd), platinum (Pt), tin (Sn), rhodium (Rh), andiridium (Ir), the production method of a metal nanoparticle composite comprising following Step A and Step B:
A) performing a step of coating a coating liquid containing polyamic acid resin and a metal compound on a substrate, wherein a content of a metal component is in a range of 1 µg/cm$^2$ to 30 µg/cm$^2$, and drying to form a dried coating film with a thickness in a range of 30 nm to 1.7 µm; and
B) performing a step of heat treatment on the coating film at a temperature in the range of 200° C. to 450° C., precipitating the metal nanoparticles by reducing metal ions (or metal salts) in the coating film to disperse the metal nanoparticles in the coating film, and imidizing the polyamic acid resin in the coating film to form a polyimide resin layer with a thickness in a range of 25 nm to 1 µm.

13. The production method of a metal nanoparticle composite according to claim 12, wherein a spacing between two adjacent metal nanoparticles is greater than and equal to a particle diameter of a larger one of the two adjacent metal nanoparticles.

14. The production method of a metal nanoparticle composite according to claim 12, wherein a volume fraction of the metal nanoparticles relative to the metal nanoparticle composite is in a range of 1% to 10%.

15. The production method of a metal nanoparticle composite according to claim 12, where the Step B is performed in an inert gas atmosphere.

16. The production method of a metal nanoparticle composite according to claim 12, the metal compound is a precursor of Au.

* * * * *